(12) United States Patent
Lee et al.

(10) Patent No.: US 9,736,205 B2
(45) Date of Patent: Aug. 15, 2017

(54) MEDIA SHARE CONTROL APPARATUS, MEDIA REPRODUCING APPARATUS, AND METHOD OF PROVIDING USER INTERFACE FOR MEDIA SHARING THEREOF

(71) Applicant: LG ELECTRONICS INC., Seoul (KR)

(72) Inventors: Seokhee Lee, Seoul (KR); Seongpyo Hong, Seoul (KR); Sungho Shin, Seoul (KR); Vinay Ramachandra, Seoul (KR); Sungmok Shin, Seoul (KR); Mikyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 729 days.

(21) Appl. No.: 13/836,264

(22) Filed: Mar. 15, 2013

(65) Prior Publication Data

US 2014/0108618 A1    Apr. 17, 2014

Related U.S. Application Data

(60) Provisional application No. 61/713,642, filed on Oct. 15, 2012, provisional application No. 61/719,913, filed on Oct. 29, 2012.

(30) Foreign Application Priority Data

Nov. 30, 2012  (KR) .......................... 10-2012-0138141
Nov. 30, 2012  (KR) .......................... 10-2012-0138142

(51) Int. Cl.
*H04L 29/06*   (2006.01)
*H04L 29/08*   (2006.01)
(Continued)

(52) U.S. Cl.
CPC .......... *H04L 65/60* (2013.01); *H04L 12/2838* (2013.01); *H04L 67/16* (2013.01);
(Continued)

(58) Field of Classification Search
CPC combination set(s) only.
See application file for complete search history.

(56) References Cited

U.S. PATENT DOCUMENTS

2003/0217136 A1* 11/2003 Cho .................... H04L 12/2818
                                                   709/223
2005/0138193 A1*  6/2005 Encarnacion ....... H04L 12/2803
                                                   709/230
(Continued)

FOREIGN PATENT DOCUMENTS

EP            1809003 A1    7/2007

*Primary Examiner* — Chris Parry
*Assistant Examiner* — Caroline Jahnige
(74) *Attorney, Agent, or Firm* — Birch, Stewart, Kolasch & Birch, LLP

(57) ABSTRACT

A media share control apparatus, a media reproducing apparatus, and a method of providing a user interface for the media share thereof are disclosed herein. Herein, A media share control apparatus includes a network interface unit and a control unit. The network interface unit may receive a search message for searching a media service daemon from a media reproducing apparatus. The control unit configured to execute a receiver picker and a media service daemon. And, the executed media service daemon performs pairing between the media reproducing apparatus and the media share control apparatus in accordance with the received search message, wherein the executed media service daemon converts a media share message transmitted from the receiver picker in accordance with a web-based protocol pre-agreed upon with the paired media reproducing apparatus, and wherein the executed media service daemon trans- (Continued)

mits the converted media share message to the paired media reproducing apparatus.

16 Claims, 16 Drawing Sheets

(51) Int. Cl.
    *H04L 12/28*     (2006.01)
    *H04N 21/41*     (2011.01)
    *H04N 21/414*     (2011.01)
    *H04N 21/436*     (2011.01)
    *H04N 21/4363*     (2011.01)
    *H04N 21/472*     (2011.01)
    *G06F 3/01*     (2006.01)
    *G06F 15/16*     (2006.01)
    *H04W 12/06*     (2009.01)

(52) U.S. Cl.
    CPC ... *H04N 21/4122* (2013.01); *H04N 21/41407* (2013.01); *H04N 21/43615* (2013.01); *H04N 21/43637* (2013.01); *H04N 21/47217* (2013.01); *G06F 3/01* (2013.01); *G06F 15/16* (2013.01); *H04L 63/083* (2013.01); *H04L 2012/2849* (2013.01); *H04W 12/06* (2013.01)

(56) References Cited

U.S. PATENT DOCUMENTS

| | | | | |
|---|---|---|---|---|
| 2007/0162586 | A1* | 7/2007 | Kim | H04L 67/16 709/223 |
| 2007/0211762 | A1* | 9/2007 | Song | H04L 67/16 370/490 |
| 2007/0237141 | A1* | 10/2007 | Marchese | H04L 41/0853 370/389 |
| 2008/0281976 | A1* | 11/2008 | Kemp | H04L 12/18 709/230 |
| 2009/0177971 | A1* | 7/2009 | Kim | H04L 67/02 715/739 |
| 2009/0235277 | A1* | 9/2009 | Liu | H04L 41/0809 719/313 |
| 2012/0059875 | A1* | 3/2012 | Clark | H04L 67/14 709/203 |
| 2012/0272148 | A1* | 10/2012 | Strober | H04L 65/60 715/716 |
| 2012/0324024 | A1* | 12/2012 | Benassaya | H04W 4/003 709/206 |
| 2013/0067102 | A1* | 3/2013 | Paller | H04L 65/105 709/228 |

\* cited by examiner

MEDIA SHARE CONTROL APPARATUS, MEDIA REPRODUCING APPARATUS, AND METHOD OF PROVIDING USER INTERFACE FOR MEDIA SHARING THEREOF

This application claims the benefit of the Korean Patent Application No. 10-2012-0138141, filed on Nov. 30, 2012 and No. 10-2012-0138142, filed on Nov. 30, 2012, and the benefit of U.S. Provisional Application No. 61/713,642, filed on Oct. 15, 2012, and the benefit of U.S. Provisional Application No. 61/719,913, filed on Oct. 29, 2012, which are hereby incorporated by reference as if fully set forth herein.

BACKGROUND OF THE INVENTION

Field of the Invention

The present invention relates to system related to a media share control apparatus, a media reproducing apparatus, and a method of providing a user interface for the media share thereof and, more particularly, to a media share control apparatus, a media reproducing apparatus, and a method of providing a user interface for the media share thereof that can share media contents in real time.

Discussion of the Related Art

Electronic apparatuses, such as smart phones, smart TVs, and so on, provide a function enabling a web application to be additionally installed by the user or automatically. Herein, a web application refers to an application that can be accessed through the internet and also refers to software, which is written in a language supported by a corresponding browser, and which can be executed within the web browser. Such web applications may be installed in electronic apparatuses, such as smart phones, smart TVs, and so on, so that the electronic apparatuses can be used as general-purpose devices capable of performing diverse functions.

Additionally, electronic apparatuses, such as smart phones, smart TVs, and so on, may share digital media between one another in real time by using a media share technology, such as AirPlay and Digital Living Network Alliance (DLNA).

Herein, DLNA corresponds to an official non-profit collaborative trade organization responsible for the commercialization and common usage of home networks. And, the DLNA aims to establish a backward compatible platform based upon an already-established and disclosed industry standard, and to realize convergence between industries. Such DLNA promotes the adoption of manufacturers' guideline based upon Universal Plug and Play (UPnP), which is broadly used among manufacturers of electrical appliances, personal computers (PCs), wireless devices, and so on.

The guideline that is currently adopted by the DNLA provides design principles allowing contents to be shared by various products and diverse manufacturing brands through a wireless/wired home network interconnecting electrical appliances, PCs, and wireless devices. Accordingly, the products that are designed based upon such guidelines may be capable of sharing Media Contents, such as music, pictures (or images), video, and so on. And, the media contents that are stored in the media server in real-time via streaming and shared by media reproducing apparatuses may be reproduced.

AirPlay corresponds to a media sharing technology provided by Apple Inc.

By using the related art media sharing technology, in order to implement a media receiver, diverse components that are required for the media service are required to be implemented by using the functions supported by a native platform. Most particularly, since the media receiver cannot be implemented by using only web standard technologies, such as Javascript, Hypertext Markup Language (HTML), HTML5, and so on, the media receiver cannot be implemented as a web application type.

SUMMARY OF THE INVENTION

Accordingly, the present invention is directed to a media share control apparatus, a media reproducing apparatus, and a method of providing a user interface for the media share thereof that substantially obviate one or more problems due to limitations and disadvantages of the related art.

An object of the present invention is to provide a media share control apparatus, a media reproducing apparatus, and a method of providing a user interface for the media share thereof that can be designed to realize a media receiver end by using a standard web technology.

Another object of the present invention is to provide a media share control apparatus, a media reproducing apparatus, and a method of providing a user interface for the media share thereof enabling a media share application to be realized in a Thin Client.

Yet another object of the present invention is to provide a media share control apparatus, a media reproducing apparatus, and a method of providing a user interface for the media share thereof that can realize a media share application performing a media receiver function as a web application type.

A further object of the present invention is to provide a media share control apparatus, a media reproducing apparatus, and a method of providing a user interface for the media share thereof that can provide a user with a more convenient media share service.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a media share control apparatus includes a network interface unit configured to receive a search message for searching a media service daemon from a media reproducing apparatus, and a control unit configured to execute a receiver picker and a media service daemon. Herein, the executed media service daemon may perform pairing between the media reproducing apparatus and the media share control apparatus in accordance with the received search message, the executed media service daemon may convert a media share message transmitted from the receiver picker in accordance with a web-based protocol pre-agreed upon with the paired media reproducing apparatus, and the executed media service daemon may transmit the converted media share message to the paired media reproducing apparatus.

The media share message may include at least one of a Play command, a Playback command, and a Stop command. The Play command may include a Uniform Resource Locator (URL) of a content commanded to be played by the receiver picker, and the media reproducing apparatus may receive a media stream of the content based upon the URL.

The media service daemon may be controlled to transmit at least one of a service name of a media share service, an address of the media service daemon, and a device name of the media reproducing apparatus to the receiver picker.

The media service daemon may include the paired media reproducing apparatus in a media receiver list.

The media service daemon may be executed as a background.

The media service daemon may open a port for receiving the search message transmitted from the media reproducing apparatus and waiting for the search message to be transmitted thereto.

The media service daemon may be configured as a plug-in.

Among modules of the media service daemon, at least one of a module communicating with the receiver picker by using a media share protocol and a module discovering the receiver picker may be configured as a plug-in.

In another aspect of the present invention, a media reproducing apparatus includes a network interface unit configured to transmit a search message for searching a media service daemon to a media share control apparatus, and a control unit configured to execute a web socket-based service discovery and a communication management module. Herein, the executed web socket-based service discovery may be controlled so that the search message can be transmitted in accordance with a web-based protocol pre-agreed upon with the media share control apparatus. And, when a response to the transmitted search message is received from the media share control apparatus, the executed web socket-based service discovery may perform pairing with the media share control apparatus, and when the media share message being transmitted in accordance with the web-based protocol from the paired media share control apparatus is received, the executed communication management module may parse the received media share message.

The media share message may include at least one of a Play command, a Playback command, and a Stop command. The Play command may include a Uniform Resource Locator (URL) of a content commanded to be played by the media control apparatus, and the control unit may control the media reproducing apparatus so that a media stream of the content can be received based upon the URL.

The web socket-based service discovery may control the media reproducing apparatus so that the search message can be transmitted to all Internet Protocol (IP) addresses included in a sub network to which the media reproducing apparatus belongs.

In yet another aspect of the present invention, a media share application providing server includes a storage unit configured to store at least one of a media receiver application and a media service daemon application, a network interface unit configured to receive a download request message from an electronic apparatus, the download request message requesting for the media receiver application or the media service daemon application to be downloaded, and a control unit configured to perform control operations for transmitting the stored receiver application or the stored media service daemon application to the electronic apparatus based upon the received download request message.

In yet another aspect of the present invention, a media sharing method includes the steps of having a media service daemon receive a first search message from a media reproducing apparatus in order to search for a media service daemon, having the media service daemon perform pairing with the media reproducing apparatus in accordance with the received first search message, receiving a second search message enabling the media service daemon to verify whether or not a media share service exists from a receiver picker, having the media service daemon transmit a response to the second search message to the media service daemon in accordance with the received second search message, having the media service daemon receive a media play request message from the receiver picker, having the media service daemon convert the received media play request message in accordance with a web-based protocol pre-agreed upon with the paired media reproducing apparatus, and having the media service daemon perform control operations enabling the converted media play request message to be transmitted to the paired media reproducing apparatus.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
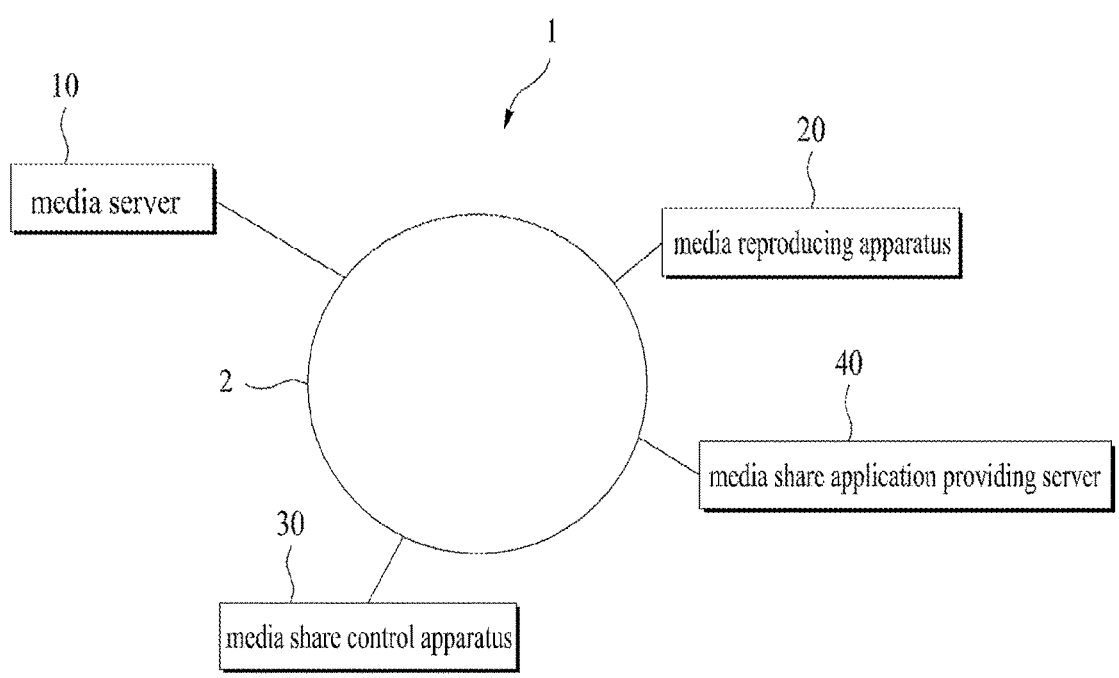
FIG. 1 illustrates a block diagram showing a structure of a media share system according to an exemplary embodiment of the present invention.

Reference will now be made in detail to the preferred embodiments of the present invention, examples of which are illustrated in the accompanying drawings.

In the following description of the present invention, the suffix "module", which is mentioned in each element used in the present invention, may signify a program, software, a Plug-in, a library, and a program being executed within a driver and an electronic apparatus.

Meanwhile, the electronic apparatus being described in this disclosure corresponds to an intelligent electronic apparatus further including a computer-supported function in addition to a broadcast receiving function. Herein, while being committed to the broadcast receiving function, by further including an internet function, the electronic apparatus according to the present invention may be equipped with an interface providing more usage convenience, such as a manually inputting input device, a touch-screen, a touch-pad, a spatial remote controller, and so on. Moreover, by being supported with a wireless or wired internet function, the electronic apparatus according to the present invention may be connected to the internet and a computer, so as to perform functions, such as e-mailing, web browsing, e-banking, gaming, and so on. In order to perform such variety of functions, a standardized general-purpose operating system (OS) may be used.

Accordingly, for example, since the electronic apparatus various applications can be freely added or deleted within a universal kernel, diverse user-friendly functions may be performed. More specifically, for example, the electronic apparatus may correspond to a network TV, an HBBTV, a smart TV, and an Open Hybrid TeleVision (OHTV). And, in some cases, the electronic apparatus may be applied to smart phones, PCs, and electronic devices. Furthermore, an application being installed in the electronic apparatus may include an application and a web application.

Reference will now be made in detail to the preferred embodiments of the present invention, examples of which are illustrated in the accompanying drawings. However, the embodiment of the present invention described below may be modified to a wide range of modifications. And, therefore, it should be understood that the present invention will not be limited only to the example presented in the description of the present invention set forth herein.

Although the terms used in the present invention are selected from generally known and used terms, the terms used herein may be varied or modified in accordance with the intentions or practice of anyone skilled in the art, or along with the advent of a new technology. Alternatively, in some particular cases, some of the terms mentioned in the description of the present invention may be selected by the applicant at his or her discretion, the detailed meanings of which are described in relevant parts of the description herein. Furthermore, it is required that the present invention is understood not simply by the actual terms used but by the meaning of each term lying within.

FIG. 1 illustrates a block diagram showing a structure of a media share system according to an exemplary embodiment of the present invention.

Referring to FIG. 1, a Media Share System 1 may include at least one of a media server 10, a media reproducing apparatus 20, a media share control apparatus 30, and a media share application providing server 40. Herein, the media server 10, the media reproducing apparatus 20, the media share control apparatus 30, and the media share application providing server 40 may be connected to a network 2.

The network 2 may be configured of at least one of a backbone network and a local loop. Herein, the backbone network may be configured of one of an X.25 network, a Frame Relay network, an Asynchronous Transfer Mode (ATM) network, a Multi Protocol Label Switching (MPLS) network, and a Generalized Multi Protocol Label Switching (GMPLS), or the backbone network may be configured of a combination of the above-mentioned networks. The local loop may corresponds to Fiber to The Home (FTTH), Asymmetric Digital Subscriber Line (ADSL), a cable network, Wireless LAN (IEEE 802.11b, IEEE 802.11a, IEEE802.11g, and IEEE802.11n), Wireless Broadband (Wi-Bro), Wimax, and High Speed Downlink Packet Access (HSDPA). According to a portion of the embodiment of the present invention, the network 2 may correspond to an internet network and may also correspond to a mobile communication network.

According to a portion of the embodiment of the present invention, the media server 10, the media reproducing apparatus 20, and the media share control apparatus 30 may be located within the same local loop, local network, or sub network, and the media share application providing server 40 may be located in a backbone network or an internet network.

The media server 10 stores media data, such as pictures, music, moving pictures or videos, and so on. And, then, the media server 10 provides the stored media data to the media reproducing apparatus 20. The media server 10 may provide the media data to the media reproducing apparatus 20 via streaming.

The media reproducing apparatus 20 reproduces the media data. The media reproducing apparatus 20 may receive media streaming from the media server 10 in accordance with the control of the media share control apparatus 30 and may then reproduce the received media streaming.

The media share control apparatus 30 controls the media reproducing apparatus 20 and also performs control operations enabling the media data being stored in the media server 10 to be reproduced by the media reproducing apparatus 20.

The media share control apparatus 30 searches for the media server 10 and the media reproducing apparatus 20, which exist within the same network, based upon a pre-decided protocol and then accesses the searched media server 10 and media reproducing apparatus 20. Thereafter, the media share control apparatus 30 may provide a Graphic User Interface (GUI) respective to the media data existing in the media server 10. Accordingly, the user may be capable of easily and conveniently selecting the wanted media reproducing apparatus 20 and media data through the GUI, which is provided by the media share control apparatus 30. Herein, the pre-decided protocol may include at least one of a multicast protocol and a web-based protocol.

The media share control apparatus 30 may be configured of a mobile device being equipped with a touch-screen, which provides a GUI based upon the user's touch gesture. Additionally, according to the embodiment of the present invention, the media share control apparatus 30 may also provide a User Interface based upon another UI means, such as gesture, voice or sound, and so on.

Referring to FIG. 1, although it is shown that the media server 10, the media reproducing apparatus 20, and the media share control apparatus 30 are each configured as separate elements, this is merely an exemplary structure given to simplify the description of the present invention. And, therefore, the present invention will not be limited only to the structure presented in the example given herein. Accordingly, one element may perform functions corresponding to the role (or function) of at least two or more of the above-described elements of the present invention. More specifically, the media server 10 and the media reproducing apparatus 20 may be configured as a single electronic apparatus, or the media reproducing apparatus 20 and the media share control apparatus 30 may be configured as a single electronic apparatus, or the media server 10 and the media share control apparatus 30 may be configured as a single electronic apparatus.

Hereinafter, a service having the media reproducing apparatus 20 control the media data, which are stored in the media server 10, in accordance with the control of the media share control apparatus 30 will be referred to as a media share service or a media service. Herein, a technology for providing a media service may include AirPlay and Digital Living Network Alliance (DLNA).

The media share application providing server 40 provides applications enabling the electronic apparatus to perform the functions of the media share control apparatus 30 or the functions of the media reproducing apparatus 20. Herein, the applications that are being provided may include an application (or App) or a web application (or Web App). The electronic apparatus may download the application from the media share application providing server 40. Then, the electronic apparatus may install and execute the downloaded application, thereby being capable of performing the functions of the media reproducing apparatus 20 and the media share control apparatus 30. According to a portion of the present invention, the application may be installed in the electronic apparatus at the time of the manufacturing of the electronic apparatus.

Figure 2:
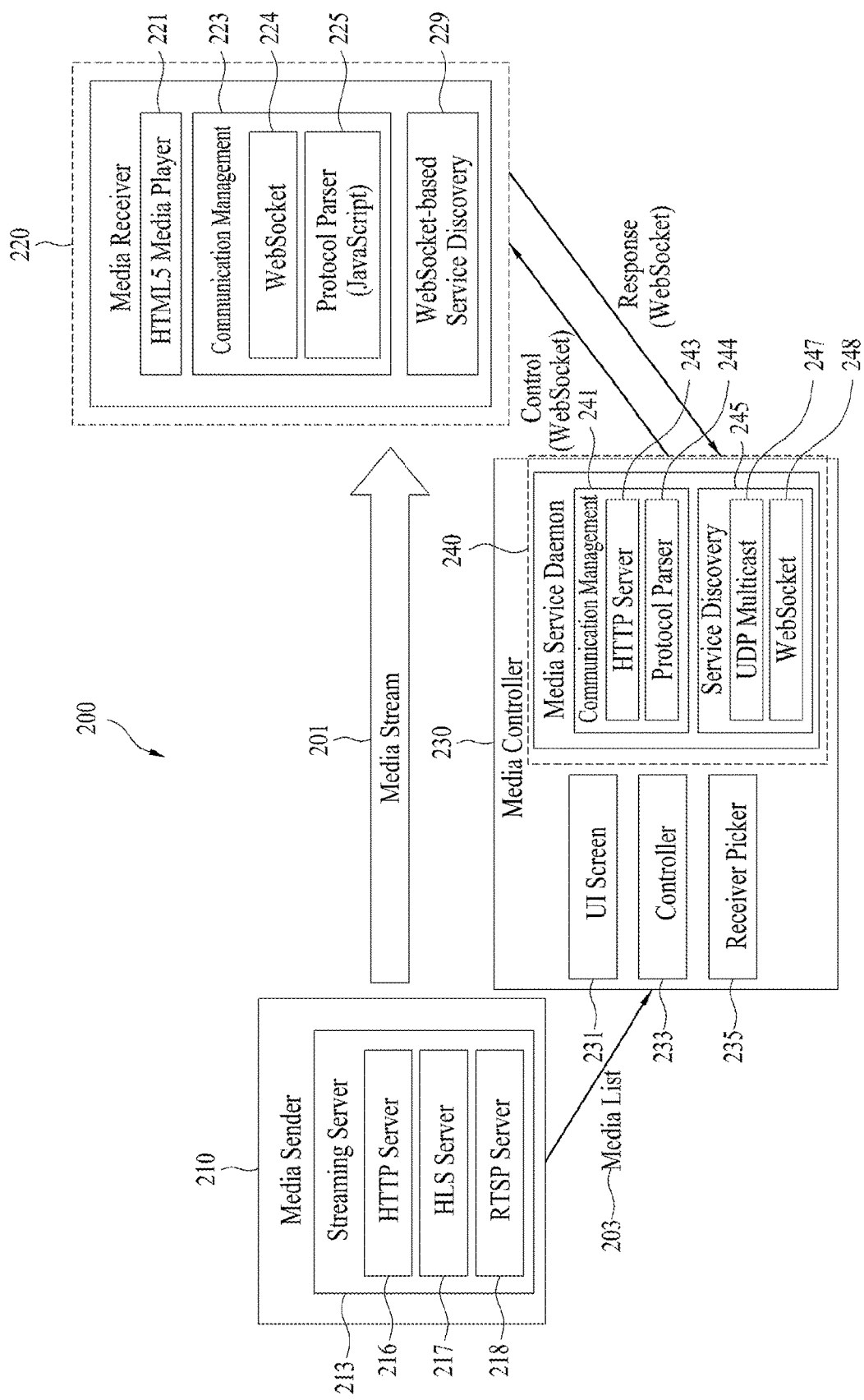
FIG. 2 illustrates an exemplary platform of the media share system according to the embodiment of the present invention.

FIG. 2 illustrates an exemplary platform of the media share system according to the embodiment of the present invention.

Referring to FIG. 2, the media share system 200 may include a Media Sender 210, a Media Receiver 220, and a Media Controller 230. The media share system 200 may correspond to an exemplary embodiment of a platform of the media share system 1, which is shown in FIG. 1. The media sender 210 may correspond to an exemplary embodiment of a platform of the media server 10, which is shown in FIG. 1, and the media receiver 220 may correspond to an exemplary embodiment of a platform of the media reproducing apparatus 20, which is shown in FIG. 1. And, the media controller 230 may correspond to an exemplary embodiment of a platform of the media share control apparatus 30, which is shown in FIG. 1.

The media sender 210 may include a Streaming Server 213. The streaming server 213 may include at least one of a Hyper Text Transfer Protocol (HTTP) server 216, which uses a Hyper Text Transfer Protocol (HTTP) so as to transmit data, information, or media, an HTTP Live Streaming (HLS) server 217, which transmits HTTP Live Streaming to the media receiver 220, and a Real Time Streaming Protocol (RTSP) server 218, which transmits a Media Stream to the media receiver 220 by using a Real Time Streaming Protocol (RTSP). Herein, the streaming server 213 may correspond to a module.

The media sender 210 may provide the media controller 230 with a media list 203 to the media controller 230, wherein the media list 203, which includes information on the media being stored in or managed by the media sender 210. The media sender 210 may be connected to the media controller 230 without performing discovery, and the media sender 210 may provide the media controller 230 with the media list 203.

The media receiver 220 may reproduce the media stream 201, which is transmitted from the media sender 210 in accordance with the control of the media controller 230. The media receiver 220 may communicate with the media controller 230 by using a web-based protocol, thereby being capable of performing streaming reproduction of the media data, such as video, audio, pictures, and so on, which are transmitted from the media sender 210. Additionally, the media receiver 220 may discover the media controller 230.

The media receiver 220 may include at least one of an HTML5 Media Player 221, a Communication Management module 223, and a Web Socket-based Service Discovery 229.

The Web Socket-based Service Discovery 229 searches for a Media Service Daemon within the network 2. The Web Socket-based Service Discovery 229 may perform a search process in order to determine whether or not a media service daemon exists within a sub network.

According to a portion of the exemplary embodiment of the present invention, the Web Socket-based Service Discovery 229 may sequentially (or serially) transmit a search message searching for a media service daemon to a media service daemon port of each IP address within the sub network. The search message may be transmitted by using a uni-cast method. At this point, the Web Socket-based Service Discovery 229 may transmit the search message to all of the IP addresses within the sub network. Since the multi-cast method is not supported in the web-based service, the present invention may find the media service daemon by using the uni-cast method.

Additionally, the Web Socket-based Service Discovery 229 may create a list of media controllers by combining the IP addresses, which are verified to have a media service daemon operating therein. Then, the Web Socket-based Service Discovery 229 may store the created media controller list. Moreover, the Web Socket-based Service Discovery 229 may automatically be paired with a media controller having the IP address, which is included in the media controller list. Then, the Web Socket-based Service Discovery 229 may display the media controller list on a display screen, so as to enable the user to select a media controller that is to be paired with the Web Socket-based Service Discovery 229.

The Web Socket-based Service Discovery 229 performs an authentication procedure with a media service daemon 240. The Web Socket-based Service Discovery 229 receives an authentication key, which is inputted by the user, wherein the authentication key is shown within the graphic user interface of the media service daemon 240. Then, the Web Socket-based Service Discovery 229 performs control operations enabling the inputted authentication key to be transmitted to the media service daemon 240 through the network 2. Thereafter, the media service daemon 240 determines whether or not the authentication key, which is transmitted from the Web Socket-based Service Discovery 229, is identical to the authentication key of the media service daemon 240. Accordingly, the media service daemon 240 may then assign (or add) a connecting authority to the media receiver 220. The media receiver 220 being assigned with the connecting authority may ensure a network channel, which can communicate with the daemon by using a media share protocol.

After the media receiver 220 is connected with the media controller 230, the communication management module 223 may parse a media service message, which corresponds to a message related to a media service being transmitted from the media service daemon 240. Additionally, the communication management module 223 may deliver the parsed media service message to the HTML5 media player 221. Herein, the media service message may include at least one of server information, receiver information, playback information, media information, a reproducing command (or reproducing request), and a stop command (or stop request). And, the media service message may also be referred to as a media share message.

The communication management module 223 may include a web socket 224 and a protocol parser 225. The web socket 224 controls a connection between the communication management module 223 and the media service daemon 240 and also controls data transmission and reception (or data transception). The protocol parser 225 parses the media service message and delivers the parsed media service message to the HTML5 media player 221.

The HTML5 media player 221 may reproduce a media stream 201 based upon the media service message, which is parsed by the communication management module 223.

The media controller 230 may include a User Interface Screen 231 configured to display a GUI, a Controller 233 configured to sense (or detect) a user request for controlling the media controller 230, a Receiver Picker 235 configured to search for a media receiver and to transmit the media service message to the media service daemon 240 or the media receiver 220, and a media service daemon 240.

The media service daemon 240 may communicate with the media controller, so as to convert a conventional media share protocol to a web-based protocol. And, then, the media service daemon 240 may perform communication with the web-based media receiver 220 based upon the converted protocol. The media service daemon 240 may include at least one of a Communication Management module 241 and a Service Discovery module 245. The media service daemon 240 may communicate with the media controller, which has executed the media service daemon 240, or may communicate with another media controller, so as to provide a media service. Alternatively, the media service daemon 240 may be capable of providing a media service by communicating with multiple media controllers.

The service discovery module 245 may perform Service Discovery. The service discovery module 245 may transmit a discovery message to the receiver picker 235, so that the receiver picker 235 can find a media receiver, which can communicate with the service discovery module 245. The service discovery module 245 may open a specific port, so that the media receiver 220 can find (or locate) a media service daemon 240, and by on stand-by.

The service discovery module 245 may respond to the connection request of the media receiver 220, so as to perform pairing between the media receiver 220 and the media controller 230. The service discovery module 245 may perform authentication based upon an authentication key, which is transmitted from the media receiver 220. The service discovery module 245 may determine whether or not the authentication key inputted by the user is identical to the authentication key transmitted from the media receiver 220. Then, when the two authentication keys are determined to be identical to one another, the service discovery module 245 may determine that the media receiver 220 has been authenticated.

The service discovery module 245 may store information on the media receiver, which has been authenticated, in the media receiver list. And, then, the service discovery module 245 may omit the authentication procedure during a next pairing process of the media receiver, which is stored (or listed) in the media receiver list.

After the connection between the media controller 230, the media service daemon 240, and the media receiver 220 is completed, the communication management module 241 may convert an actual media share protocol to a web-based protocol. And, the communication management module 241 may transmit data based upon the converted web-based protocol. The communication management module 241 may include an HTTP server 243 and a Protocol Parser 244.

The protocol parser 244 may receive a specific message, which is coded by the controller module 233 in accordance with a conventional media share protocol. Thereafter, the protocol parser 244 may parse the received message. Then, the protocol parser 244 may convert the parsed message to a protocol that can be decrypted by the media receiver 220. For example, the protocol parser 244 may convert the parsed message to a web-based protocol.

The HTTP server 243 transmits the converted HTTP-based message to the media receiver 220.

Figure 3:
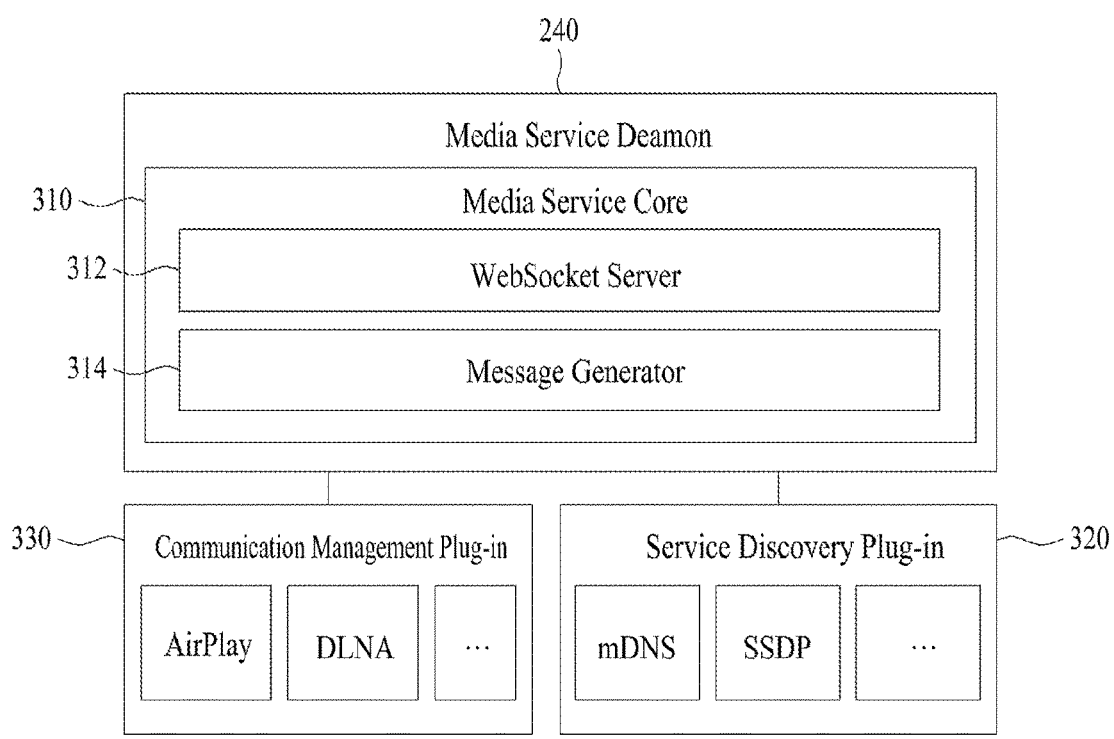
FIG. 3 illustrates a block diagram showing a structure of a Media Service Daemon according to an exemplary embodiment of the present invention.

FIG. 3 illustrates a block diagram showing a structure of a Media Service Daemon according to an exemplary embodiment of the present invention.

Referring to FIG. 3, the media service daemon 240 may be realized as a plug-in type. Accordingly, the media control apparatus 30 according to the present invention may process diverse media share protocols. Additionally, apart from a protocol of the media controller 230 end, since the media receiver 220 can be used by using the same method, the media receiver 220 may process a media service that is provided by using diverse media share protocols.

A module that can communicate with a web-based media receiver may exist in a media service core 310 of the media service daemon 240. According to a portion of the exemplary embodiment of the present invention, the media service core 310 may include a web socket server 312 for being paired and communicating with the media receiver 220 and a Message Generator 314 for generating a web-based media share protocol.

A module that communicates with the conventional media share protocol, which exists in the media service daemon 240, becomes a plug-in. Accordingly, determinacy of the media service daemon 240 may be increased.

According to a portion of the exemplary embodiment of the present invention, the media service daemon 240 may include a Service Discovery Plug-in 320 supporting a corresponding search service (mDNS, SSDP) and a Communication Management Plug-in 330 supporting a searched media service after searching a media service (AirPlay, DLNA).

Figure 4:
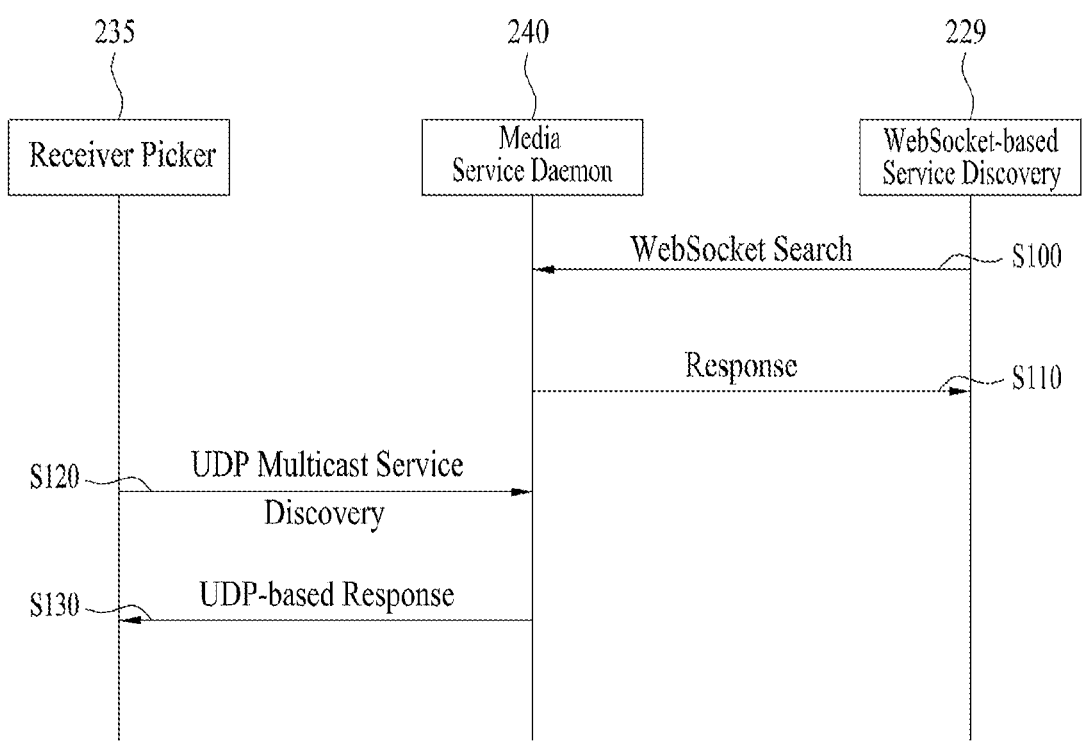
FIG. 4 illustrates a flow chart showing the process steps of a Service discovery method according to an exemplary embodiment of the present invention.

FIG. 4 illustrates a flow chart showing the process steps of a Service discovery method according to an exemplary embodiment of the present invention.

Referring to FIG. 4, the Web Socket-based Service Discovery 229 performs a web socket search (S100). According to a portion of the exemplary embodiment of the present invention, the Web Socket-based Service Discovery 229 may sequentially access each IP address existing in its subnet, thereby being capable of searching a media service daemon of the media controller end. Additionally, the Web Socket-based Service Discovery 229 may sequentially transmit a search message to a daemon port of each IP address existing in the subnet by using the uni-cast method. The transmitted search message may include at least one of a service name and an apparatus name.

The media service daemon 240 transmits a response message respective to the search message, which is transmitted from the Web Socket-based Service Discovery 229 (S110). The media service daemon 240 may generate a User Datagram Protocol (UDP) discovery message, so that the Web Socket-based Service Discovery 229, which has transmitted the search message, can be registered (or listed) in the media receiver list.

In case a response message is received from the media service daemon 240, the Web Socket-based Service Discovery 229 may add an IP address through which the response message is transmitted to the media controller list. Additionally, the Web Socket-based Service Discovery 229 may automatically be paired with the media controller having the IP address, which is listed in the media controller list. Then, the Web Socket-based Service Discovery 229 may display the media controller list on a display screen, so as to enable the user to select a media controller that is to be paired.

The receiver picker 235 performs a User Datagram Protocol Multicast (UDP Multicast)-based service search (S120). The UDP multicast-based service search may correspond to a Simple Service Discovery Protocol (SSDP) and a multicast DNS (mDNS).

As a response to the search process performed in step S120, the media service daemon 240 transmits a UDP-based Response to the receiver picker 235 (S130).

Figure 5:
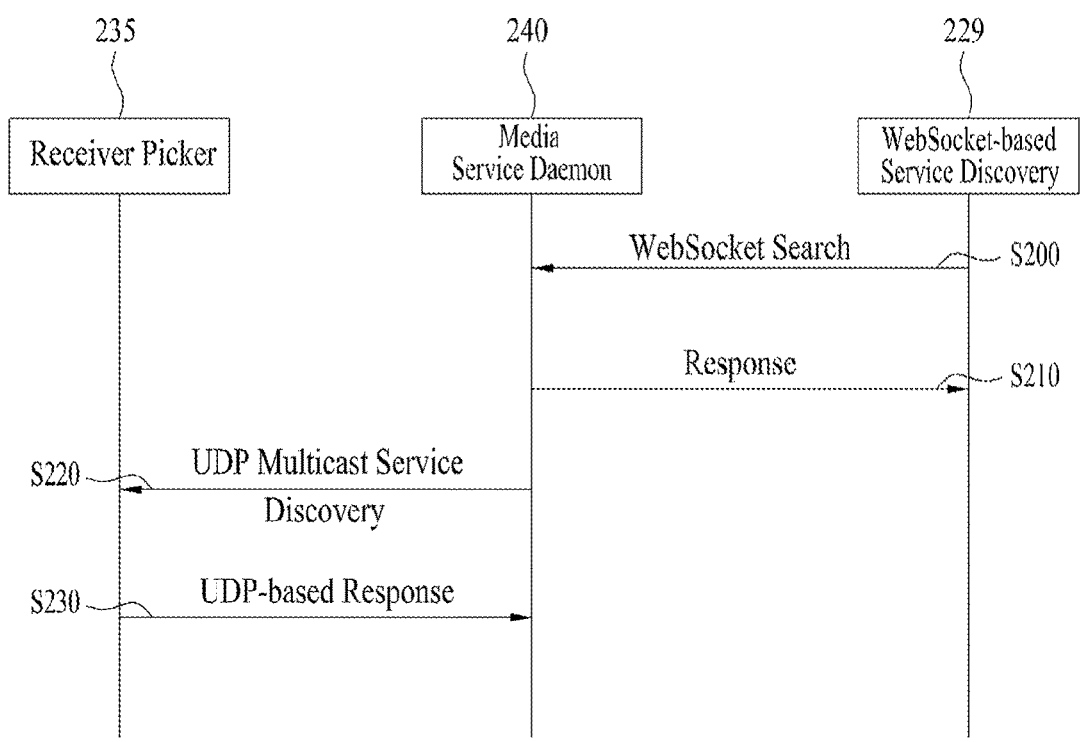
FIG. 5 illustrates a flow chart showing the process steps of a Service discovery method according to another exemplary embodiment of the present invention.

FIG. 5 illustrates a flow chart showing the process steps of a Service discovery method according to another exemplary embodiment of the present invention.

Referring to FIG. 5, the Web Socket-based Service Discovery 229 performs a web socket search (S200). According to a portion of the embodiment of the present invention, the Web Socket-based Service Discovery 229 sequentially accesses each IP address existing in its subnet, so as to find (or locate) a media service daemon at the media controller end. Additionally, the Web Socket-based Service Discovery 229 may sequentially transmit a search message to a daemon port of each IP address existing in the subnet by using the uni-cast method. The transmitted search message may include at least one of a service name and an apparatus name.

The media service daemon 240 transmits a response message respective to the search message, which is transmitted from the Web Socket-based Service Discovery 229 (S210). The media service daemon 240 may generate a User Datagram Protocol (UDP) discovery message, so that the Web Socket-based Service Discovery 229, which has transmitted the search message, can be registered (or listed) in the media receiver list.

In case a response message is received from the media service daemon 240, the Web Socket-based Service Discovery 229 may add an IP address through which the response message is transmitted to the media controller list. Additionally, the Web Socket-based Service Discovery 229 may automatically be paired with the media controller having the IP address, which is listed in the media controller list. Then, the Web Socket-based Service Discovery 229 may display the media controller list on a display screen, so as to enable the user to select a media controller that is to be paired.

The media service daemon 240 performs a User Datagram Protocol Multicast (UDP Multicast)-based service search (S220). The UDP multicast-based service search may correspond to a Simple Service Discovery Protocol (SSDP) and a multicast DNS (mDNS).

As a response to the search process performed in step S220, the receiver picker 235 transmits a UDP-based Response to the media service daemon 240 (S230).

Figure 6:
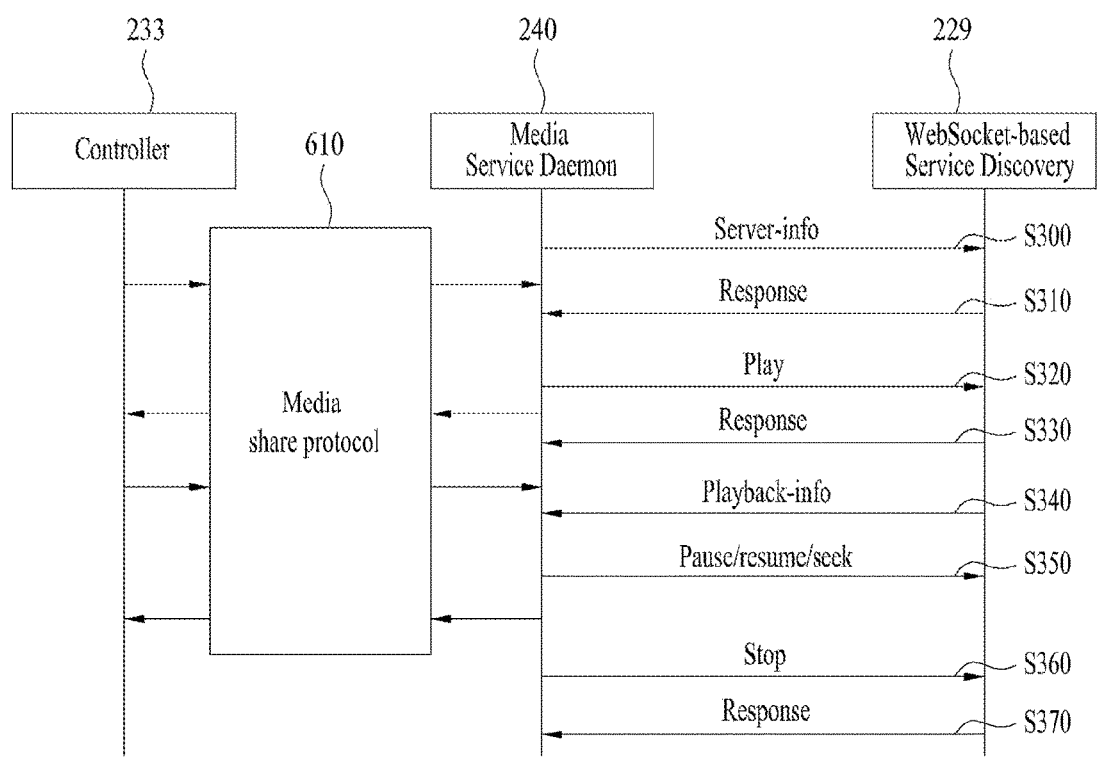
FIG. 6 illustrates a flow chart showing the process steps a media share control method according to an exemplary embodiment of the present invention.

FIG. 6 illustrates a flow chart showing the process steps a media share control method according to an exemplary embodiment of the present invention.

Referring to FIG. 6, data or information may be transmitted and received (or transceived) between the controller 233 and the media service daemon 240 based upon a media share protocol. Herein, the media share protocol may correspond to a common media share protocol, such as AirPlay, DLNA, and so on.

The media service daemon 240 requests the Web Socket-based Service Discovery 229 for service information (Server-info) (S300).

The Web Socket-based Service Discovery 229 responds to the server-info request made by the media service daemon 240 (S310). Herein, as the response to the server-info request, the Web Socket-based Service Discovery 229 may transmit information on a supportable (or available) media to the media service daemon 240.

The media service daemon 240 requests for a media to be played (or a media Play) to the Web Socket-based Service Discovery 229 (S320). Herein, the media service daemon 240 may transmit information on the media that is to be played (or reproduced). The information may correspond to a Uniform Resource Locator (URL) of the media that is to be played (or reproduced).

The Web Socket-based Service Discovery 229 responds to the Play request (S330). Herein, as a response to the Play request, the Web Socket-based Service Discovery 229 may transmit information indicating whether the media can be played (Play available) or whether the media cannot be played (Play not available) to the media service daemon 240.

The Web Socket-based Service Discovery 229 transmits Playback information (Playback-info) to the media service daemon 240 (S340). Herein, the Playback-info may include information on the current play time and play status.

The media service daemon 240 transmits a Playback command (or playback request) to the Web Socket-based Service Discovery 229 (S350). Herein, the playback command (or playback request) may include at least one of Pause, Resume, and Seek. When the Web Socket-based Service Discovery 229 receives the Playback command, the Web Socket-based Service Discovery 229 may execute the received Playback command.

Herein, the transmitted Playback command may correspond to a command inputted by the user. More specifically, the controller 233 may detect (or sense) a Playback command, which is inputted by the user, and, then, the controller 233 may transmit the detected Playback command to the media service daemon 240 in accordance with a media share protocol 610. The media service daemon 240 may then receive the Playback command, which is transmitted in accordance with the corresponding media share protocol, and may parse the received playback command. Thereafter, the media service daemon 240 may transmit the parsed playback command by using a web-based protocol.

The media service daemon 240 transmits a Stop command (or Step request) to the Web Socket-based Service Discovery 229 (S360).

The Web Socket-based Service Discovery 229 then responds to the Stop command (S370). Additionally, as a response to the received Stop command, the Web Socket-based Service Discovery 229 stops the play of the media.

Figure 7:
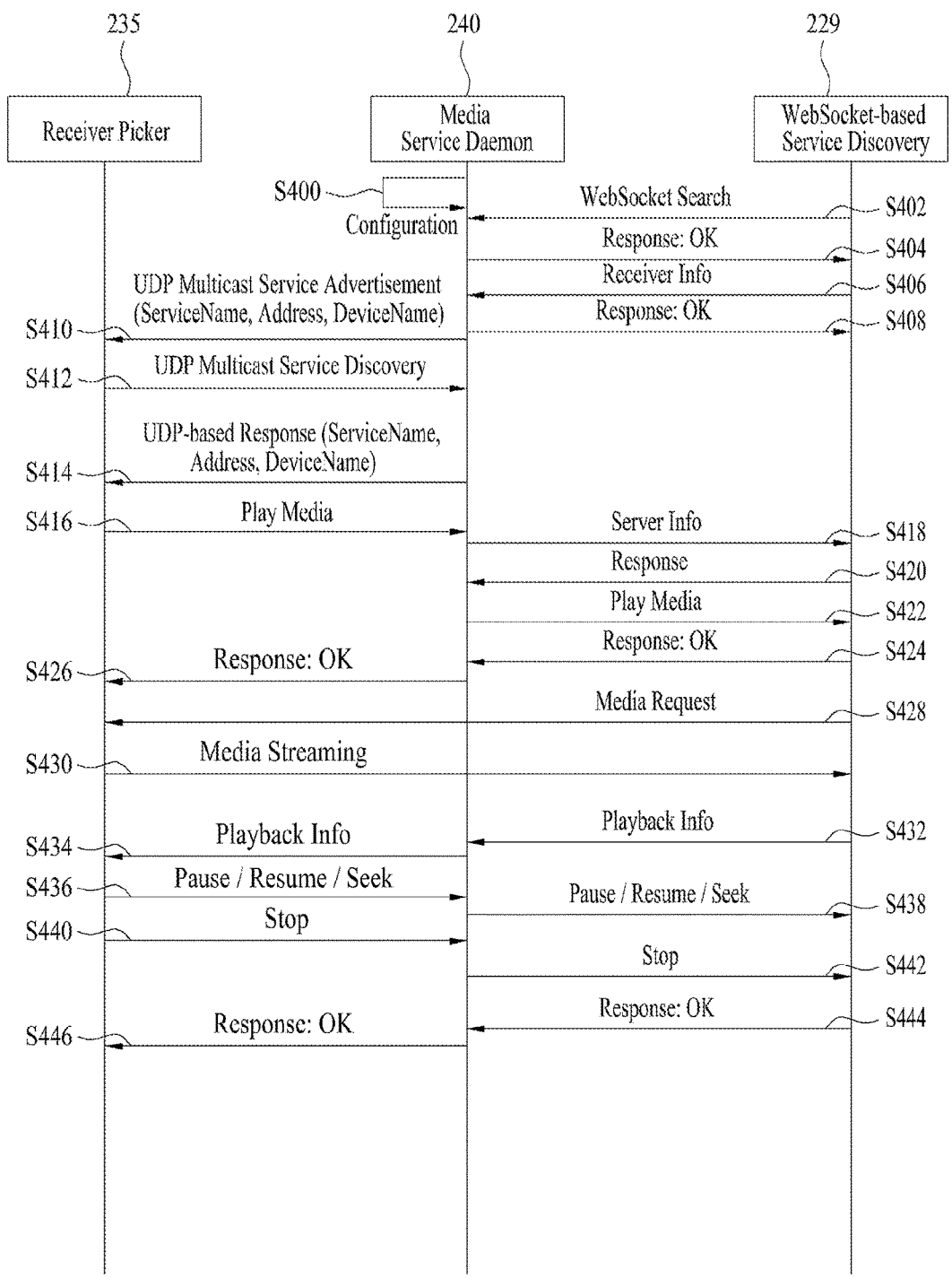
FIG. 7 illustrates a flow chart showing the process steps of a media share method according to an exemplary embodiment of the present invention.

FIG. 7 illustrates a flow chart showing the process steps of a media share method according to an exemplary embodiment of the present invention.

Referring to FIG. 7, the media service daemon 240 is turned on (S400). As shown in FIG. 3, a module communicating with the media share protocol, such as AirPlay or DLNA, may be added to the media service daemon 240 as a plug-in. The media service daemon 240 may open a daemon port of the media controller 230.

The Web Socket-based Service Discovery 229 performs a WebSocket Search (S402). According to a portion of the embodiment of the present invention, the Web Socket-based Service Discovery 229 may sequentially access each IP address existing in its subnet, thereby being capable of searching a media service daemon of the media controller end. Additionally, the Web Socket-based Service Discovery 229 may sequentially transmit a search message to a daemon port of each IP address existing in the subnet by using the uni-cast method. The transmitted search message may include at least one of a service name and an apparatus name.

The media service daemon 240 transmits a response message respective to the search message, which is transmitted from the Web Socket-based Service Discovery 229 (S404).

The Web Socket-based Service Discovery 229 transmits receiver information (receiver info) to the media service daemon 240 (S406). The receiver information may include a service name and a device name. According to a portion of the embodiment of the present invention, "WebBasedMediaSharing", which indicates a web-based media share (or sharing) service, may be transmitted as the service name, and "LGSmartTVXX", which corresponds to the apparatus (or device) name of the electronic apparatus performing the functions of the media receiver, may be transmitted as the device name.

Additionally, in case a response message is received from the media service daemon 240, the Web Socket-based Service Discovery 229 may add an IP address through which the response message is transmitted to the media controller list. The Web Socket-based Service Discovery 229 may automatically be paired with the media controller having the IP address, which is listed in the media controller list. Then, the Web Socket-based Service Discovery 229 may display the media controller list on a display screen, so as to enable the user to select a media controller that is to be paired.

The media service daemon 240 transmits a response to the reception of the receiver information to the Web Socket-based Service Discovery 229 (S408).

The media service daemon 240 transmits a Multicast Service Advertisement to the receiver picker 235 (S410). The Multicast Service Advertisement may include at least one of a ServiceName, an Address, and a DeviceName. Herein, the ServiceName may correspond to the name of a media share protocol, such as AirPlay and DLNA, the Address may correspond to a Local Address, and the DeviceName may correspond to a device name, which is included in the receiver information transmitted in step S406. The transmission of the Multicast Service Advertisement may be selectively performed in accordance with the discovery protocol, which is being used, and an execution time point of the receiver picker 235.

The receiver picker 235 performs a User Datagram Protocol Multicast (UDP multicast)-based service search (S412). The UDP multicast-based service search may correspond to a Simple Service Discovery Protocol (SSDP) and a multicast DNS (mDNS). By performing the User Datagram Protocol Multicast (UDP multicast)-based service search, the receiver picker 235 may determine whether or not a media share service, such as an AirPlay service or a DLNA service, exists. Herein, step S412 may be selectively performed in accordance with the discovery protocol, which is being used, and an execution time point of the receiver picker 235.

As a response to the search process performed in step S412, the media service daemon 240 transmits a UDP-based Response to the receiver picker 235 (S414). As the UDP-based Response, at least one of a ServiceName, an Address, and a DeviceName may be transmitted. Herein, the ServiceName may correspond to the name of a media share protocol, such as AirPlay and DLNA, the Address may correspond to a Local Address, and the DeviceName may correspond to a device name, which is included in the receiver information transmitted in step S404. Herein, step S414 may be selectively performed in accordance with the discovery protocol, which is being used, and an execution time point of the receiver picker 235.

The receiver picker 235 transmits a media play request message requesting for the play of the media to the media service daemon 240 (S416). Herein, the media play request message may include information indicating the media that is to be played and a starting time. The information indicating the media that is to be played may correspond to a URL indicating a position (or location) of the corresponding media.

The media service daemon 240 sends a request for server information (Server-info) to the Web Socket-based Service Discovery 229 (S418).

The Web Socket-based Service Discovery 229 responds to the server information request of the media service daemon 240 (S420). Herein, the Web Socket-based Service Discovery 229 may transmit information on media that is available for support to the media service daemon 240 as the response to the request made by the media service daemon 240.

The media service daemon 240 request for the Play of the media (S422). Herein, the media service daemon 240 may transmit information on the media that is to be transmitted and a starting time of the corresponding media. The information on the media that is to be played (or reproduced) may correspond to a Uniform Resource Locator (URL) of the media that is to be played. Also, the information that is transmitted in step S422 may correspond to the information that has been transmitted in step S416, and the media service daemon 240 may convert the protocol of the information, which has been transmitted in step S416, to a web-based protocol and may transmit the protocol-converted information to the Web Socket-based Service Discovery 229.

The Web Socket-based Service Discovery 229 then transmits a response to the Play request to the media service daemon 240 (S424).

When the media service daemon 240 receives the response transmitted from the Web Socket-based Service Discovery 229 in step S424, the media service daemon 240 transmits the response to the Play request, which is transmitted in step S416, to the receiver picker 235 (S426).

The Web Socket-based Service Discovery 229 sends a request for the media that is to be played (S428). The Web Socket-based Service Discovery 229 may send the request for the media to the receiver picker 235 or may directly send the request for the media to the media sender 210. Herein, the Web Socket-based Service Discovery 229 may use the media URL, which is transmitted in step S422, to send the request for the media.

The Web Socket-based Service Discovery 229 receives the media that is to be played (S430). The Web Socket-based Service Discovery 229 may receive the media that is to be played through the receiver picker 235. Alternatively, the Web Socket-based Service Discovery 229 may receive the media that is to be played directly from the media sender 210. The Web Socket-based Service Discovery 229 may receive the media that is to be played from a location indicated by the media URL, which is transmitted in step S422.

The Web Socket-based Service Discovery 229 transmits Playback information (Playback-info) to the media service daemon 240 (S432). The transmitted playback information (Playback-info) may include information on the current playback time and information on the playback status.

The media service daemon 240 transmits the playback information, which is transmitted in step S432, to the receiver picker 235 (S434). The protocol of the playback information may be converted to the media share protocol, which is currently being used, and then the processed playback information may be transmitted to the receiver picker 235.

The receiver picker 235 transmits a playback command to the media service daemon 240 (S436). The transmitted playback command may include at least one of Pause, Resume, and Seek. The transmitted playback command may correspond to a command inputted by the user. More specifically, when the controller 233 detects the playback command, which is inputted by the user, and when the controller 233 outputs the detected playback command to the receiver picker 235, the receiver picker 235 may transmit the detected playback command to the media service daemon 240 in accordance with the media share protocol, which is currently being used.

The media service daemon 240 transmits the playback command to the Web Socket-based Service Discovery 229 (S438). The transmitted playback command may include at least one of Pause, Resume, and Seek. The media service daemon 240 may convert the protocol of the playback command, which is transmitted in accordance with the media share protocol, to a web-based protocol and may transmit the processed playback command to the Web Socket-based Service Discovery 229. The Web Socket-based Service Discovery 229 executes the playback command, which is received from the media service daemon 240.

The receiver picker 235 transmits a Stop command to the media service daemon 240 (S440). Herein, the Stop command may be transmitted in accordance with the media share protocol, which is currently used.

The media service daemon 240 transmits the Stop command, which is transmitted in step S440, to the Web Socket-based Service Discovery 229 (S442). The media service daemon 240 may convert the protocol of the Stop command, which is transmitted in accordance with the media share protocol, to a web-based protocol and may transmit the processed Stop command to the Web Socket-based Service Discovery 229.

The Web Socket-based Service Discovery 229 then transmits a response to the received Stop command to the media service daemon 240 (S444). Additionally, the Web Socket-based Service Discovery 229 stops the playback of the media in accordance with the Stop command.

In case the media service daemon 240 receives the response, which is transmitted in step S444, the media service daemon 240 transmits the response to the Stop command, which is transmitted in step S444, to the receiver picker 235 (S446).

According to a portion of the embodiment of the present invention, steps S420, S424, S428, S432, and S444 may be executed (or performed) by the communication management module 223, and data, information or messages transmitted in steps S418, S422, S430, S438, and S442 may be received by the communication management module 223.

Figure 8:
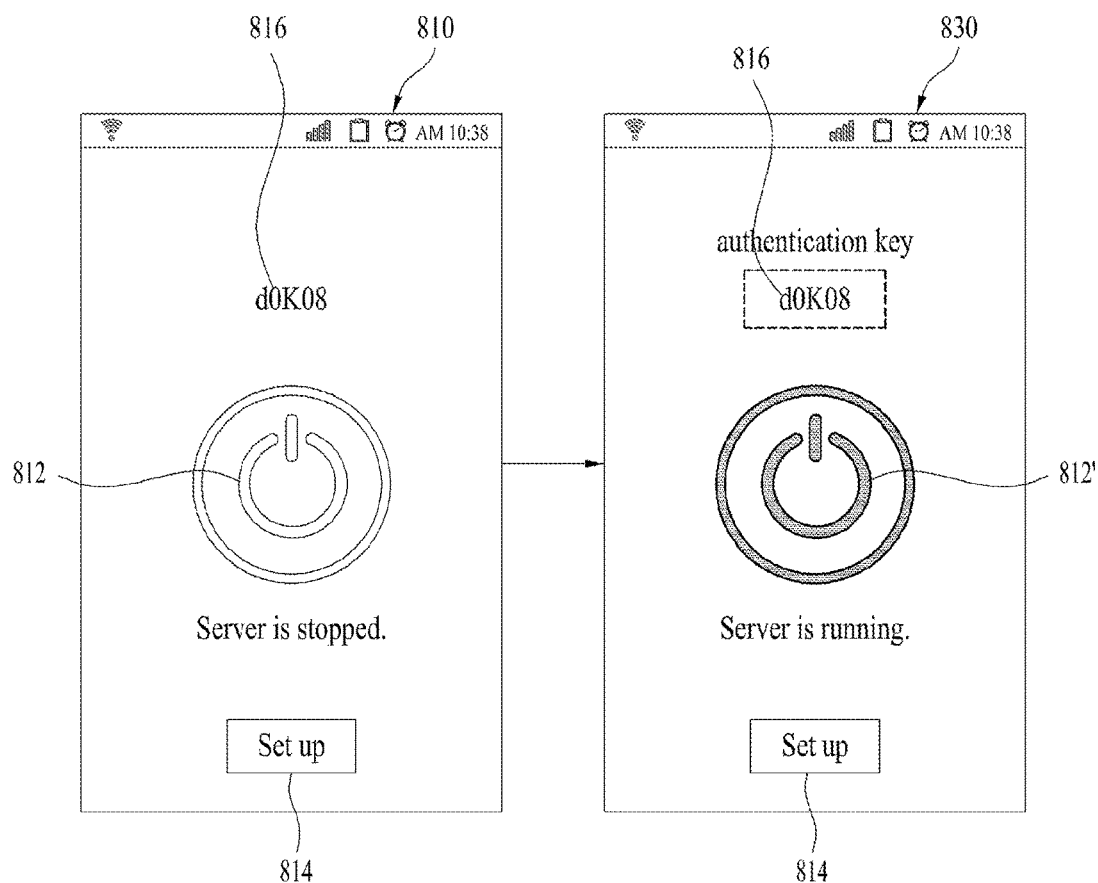
FIG. 8 illustrates an exemplary graphic user interface for performing an authentication procedure according to the present invention.

FIG. 8 illustrates an exemplary graphic user interface for performing an authentication procedure according to the present invention.

Referring to FIG. 8, the display screen 810 corresponds to a display screen for executing the media service daemon 240 from the media share control apparatus 30. The display screen 810 includes an execution button 812 and a set-up button 814. The user may perform a user action of touching the execution button 812, so as to execute the media service daemon 240. Additionally, the user may perform a user action of touching the set-up button 814, thereby enabling a GUI for inputting media service daemon settings to be displayed.

The display screen 810 displays an authentication key 816 for pairing the media share control apparatus 30 with the media reproducing apparatus 20. The authentication key 816 may either be inputted by the user, or be automatically generated by the media share control apparatus 30. When the authentication key 816 is inputted to the media reproducing apparatus 20 during the initial pairing process, the media reproducing apparatus 20 stores the inputted authentication key 816. Thereafter, during the next pairing processes, the media reproducing apparatus 20 may automatically perform the pairing process by using the stored authentication key 816. The authenticated media reproducing apparatuses may be managed through the media service daemon 240 by being listed in a list of media receivers (or media receiver list). Thereafter, the media reproducing apparatuses that are listed in the media receiver list may be automatically paired.

The display screen 830 corresponds to a display showing a state when the media service daemon is executed in the media share control apparatus 30. The user may perform a user action of touching the execution button 812', so as to stop the execution of the media service daemon 240. According to a portion of the embodiment of the present invention, the media service daemon 240 may be executed as a background screen.

Figure 9:
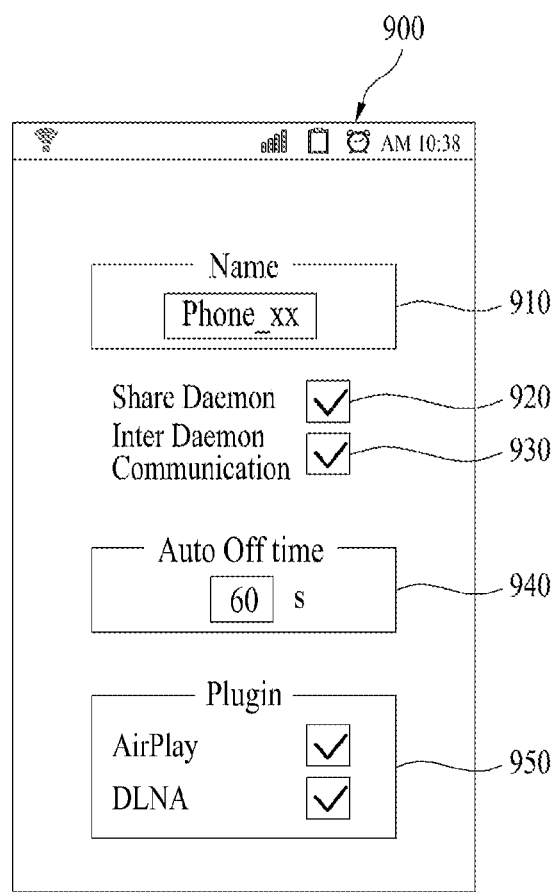
FIG. 9 illustrates an exemplary graphic user interface for media service daemon settings according to the embodiment of the present invention.

FIG. 9 illustrates an exemplary graphic user interface for media service daemon settings according to the embodiment of the present invention.

Referring to FIG. 9, the display screen 900 displays a GUI for inputting media service daemon settings. The GUI 900 includes a Name set-up region 910, a Share Daemon region 920, an Inter Daemon Communication set-up region 930, an Auto Off Time set-up region 940, and a Plug-in set-up region 950.

The Name set-up region 910 is used for setting-up the same of the media service daemon that is to be displayed on the media reproducing apparatus 20. The user may set up the media service daemon name (Phone XX) in the Name set-up region 910 and may change the set-up name (Phone XX).

The Share Daemon region 920 is used for inputting settings so that multiple media controllers, which are executed in other media share control apparatuses, can be supported by using a single media service daemon. In case the Share Daemon option is checked, the media service daemon of the media share control apparatus 30 may provide a function of the media service daemon to another media share control apparatus. More specifically, the other media share control apparatus may use the media service daemon of the media share control apparatus 30, so that the media reproducing apparatus 20 can be controlled to reproduce (or playback) the media stream, which is transmitted by the media server 10. Hereinafter, the above-described situation may also be referred to as a daemon share (or sharing) situation.

Instead of the daemon share (or sharing) situation, in case of a situation when a separate media service daemon is executed in each media reproducing apparatus, the Inter Daemon Communication set-up region 930 is used for inputting settings, so that a specific media service daemon can communicate with the media reproducing apparatus 20 as the main (or representative) media service daemon. In case the Inter Daemon Communication option is checked, since only a single media service daemon communicates with the media reproducing apparatus 20, delay caused by the discovery and pairing processes may be minimized. According to a portion of the embodiment of the present invention, the main media service daemon may be decided as a media service daemon being installed in a media share control apparatus having the smallest IP address or as a media service daemon being installed in a media share control apparatus having the largest IP address.

The Auto Off Time set-up region 940 is used for setting up an Auto Off Time in order to prevent the user from accidentally executing a media service daemon without executing a media service. For example, when the Auto Off Time is set to 60 seconds, the corresponding media service daemon is automatically turned off if there is not media service request. And, the corresponding media service daemon may be initialized is a media service request is received during the 60 seconds.

The Plug-in set-up region 950 is used for indicating available plug-ins and for enabling the user to select the indicated plug-ins. The plug-in may include at least one of a service discovery plug-in supporting media service search and a communication management plug-in supporting reception and parsing of media share data. For example, mDNS, SSDP, and so on may correspond to the service discovery plug-in, and AirPlay, DLNA, and so on may correspond to the communication management plug-in.

Only the plug-in that is selected in the Plug-in set-up region 950 may be activated, and the remaining plug-ins may each be in a deactivated state.

Figure 10:
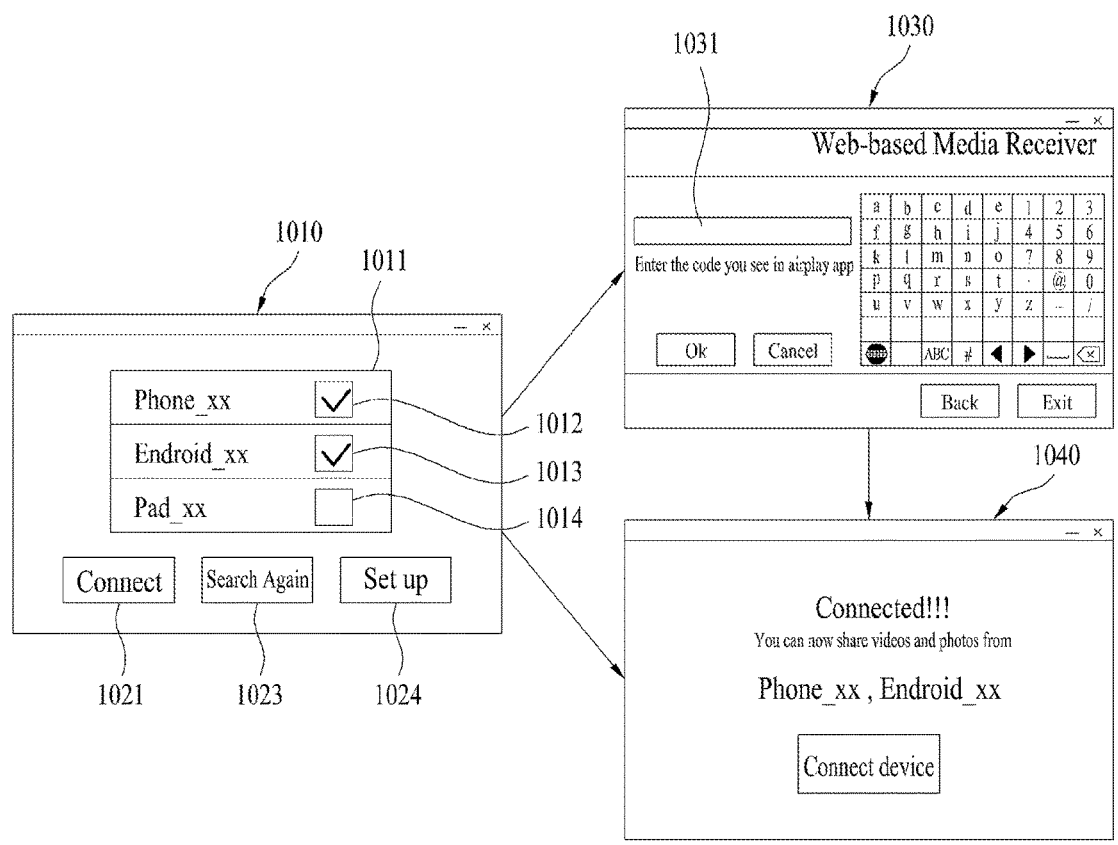
FIG. 10 illustrates an exemplary graphic user interface for a media service daemon connection according to the embodiment of the present invention.

FIG. 10 illustrates an exemplary graphic user interface for a media service daemon connection according to the embodiment of the present invention.

Referring to FIG. 10, a GUI for inputting media service daemon settings is displayed on the display screen 1010. Herein, the display screen 1010 may correspond to a screen displayed on the media reproducing apparatus 20. The GUI 1010 may include a Daemon List 1011, a Connect button 1021, a Search Again button 1023, and a Set-up button 1024.

The Daemon List 1011 includes a list of media service daemons that are available for connection. Media service daemons that are included in a media controller list may be listed in the Daemon List 1011. The user may check one or more check boxes 1012, 1013, and 1014 so as to select one or more corresponding media service daemons. For example, the user may check a check box 1012, so as to select a media service daemon entitled Phone_xx, and the user may also check a check box 1013, so as to select a media service daemon entitled Endroid_xx.

When a user motion or action selecting the Connect button 1021 is detected (or sensed), a pairing process between the media reproducing apparatus 20 and the media service daemon, which is selected from the Daemon List 1011 is executed.

When the pairing process between the media reproducing apparatus 20 and the selected media service daemon is executed for the first time, a GUI for inputting an authentication key may be displayed. And, a GUI 1030 may be displayed through the GUI. The user may input an authentication key in an inputting area 1031 of the GUI 1030. The media reproducing apparatus 20 may execute an authentication process between the media reproducing apparatus 20 and the media service daemon by using the inputted authentication key.

When the pairing process between the media reproducing apparatus 20 and the selected media service daemon is completed, a GUI indicating that the corresponding media service is available for execution may be displayed. A respective GUI 1040 may be displayed through the GUI. Herein, names of the connected media service daemons, such as Phone_xx, Endroid_xx, and so on may be displayed in the GUI 1040.

When a user motion or action selecting the Search Again button 1023 is detected (or sensed), media service daemon search is performed. At this point, the Web Socket-based Service Discovery 229 may perform the media service daemon search process by using the method disclosed in FIG. 2. In the searched media service daemon does not exist in the Daemon List 1011, the user may select the Search Again button 1023, so as to request for a media service daemon search process to be performed once again. Based upon the result of the newly performed search process (i.e., Re-search or Search again process), the searched media service daemon may be included in the media controller list.

When a user motion or action selecting the Set-up button 1024 is detected (or sensed), a GUI for inputting detailed media receiver settings is displayed.

Figure 11:
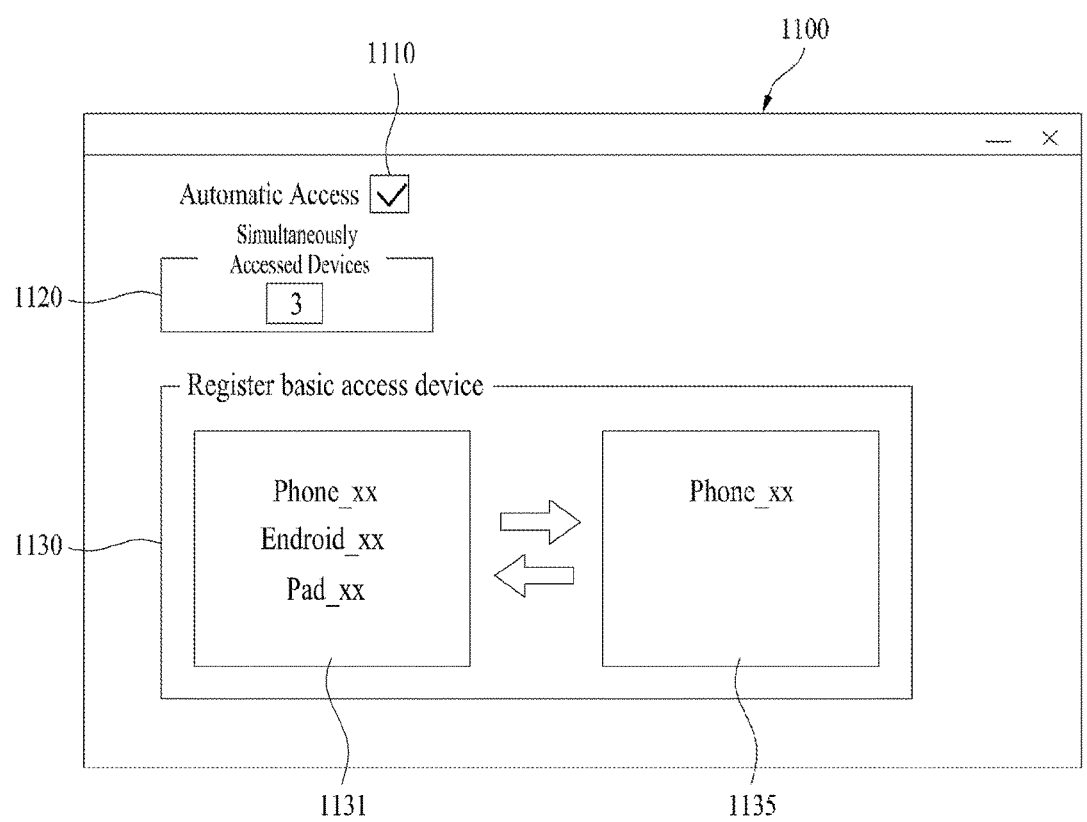
FIG. 11 illustrates a graphic user interface for detailed media receiver settings according to the embodiment of the present invention.

FIG. 11 illustrates a graphic user interface for detailed media receiver settings according to the embodiment of the present invention.

Referring to FIG. 11, the GUI 1100 is used for inputting detailed media receiving settings. Herein, the GUI 1100 may include an Auto Connect Set-up region 1110, a Simultaneous Access Device Set-up region 1120, and a Basic Access Device Set-up region 1130.

When only one media service daemon is searched, or when a media service daemon, which is registered in a basic access device, is searched, the Auto Connect Set-up region 1110 is used for inputting settings so that a pairing process between the media reproducing apparatus 20 and the corresponding media service daemon can be automatically attempted. In case the Auto Connect Set-up region 1110 is checked, the media reproducing apparatus 20 does not display a GUI for connective the media service daemon, and, instead, the media reproducing apparatus 20 may automatically perform the pairing process between the media reproducing apparatus 20 and the media service daemon.

The Simultaneous Access Device Set-up region 1120 is used for setting up a number of media service daemons available for simultaneous access. For example, in case '3' is inputted in the Simultaneous Access Device Set-up region 1120, 3 media service daemons can be simultaneously connected to the media reproducing apparatus 20.

The Basic Access Device Set-up region 1130 is used for listing (or registering) the media service daemon as the basic access device. The searched media service daemon may be listed in one list 1131, and a media service daemon, which is registered as the basic access device, may be listed in another list 1135. Referring to FIG. 11, it may be verified that Phone xx is registered as the basic access device.

Figure 12:
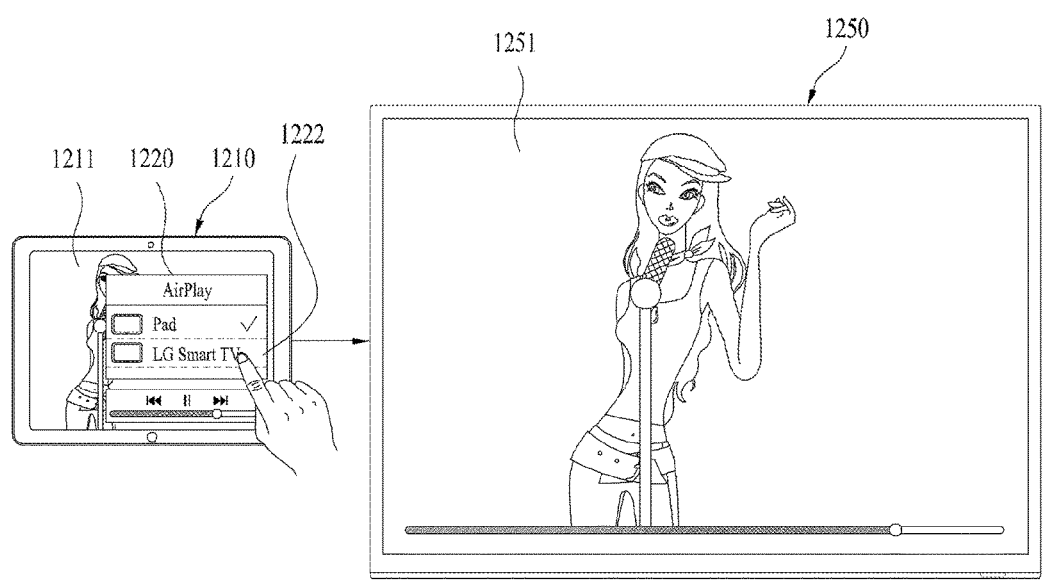
FIG. 12 illustrates an exemplary media share control apparatus and an exemplary display screen showing the execution of a media service within a media reproducing apparatus according to an embodiment of the present invention.

FIG. 12 illustrates an exemplary media share control apparatus and an exemplary display screen showing the execution of a media service within a media reproducing apparatus according to an embodiment of the present invention.

Referring to FIG. 12, the media service daemon 240 may be installed in the electronic apparatus 1210. When the installed media service daemon 240 is executed, the electronic apparatus 1210 may perform the functions of the media share control apparatus 30. The user may execute the media service daemon, which is installed in the electronic apparatus 1210 by using the GUI 810 shown in FIG. 8. And, then, the user may set up the installed media service daemon through the GUI 900 shown in FIG. 9.

A media receiver web application may be installed in another electronic apparatus 1250. Herein, the media receiver web application may include at least one of HTML5 Media Player 221, a Communication Management module 223, and a Web Socket-based Service Discovery 229, which are shown in FIG. 5. When the installed media receiver web application is executed, the electronic apparatus 1250 may perform the functions of the media reproducing apparatus 20.

By using the method described above with reference to FIG. 2, the media service daemon of the media share control apparatus 1210 and the web socket-based service discovery of the media reproducing apparatus 1250 may perform a pairing process between the media share control apparatus 1210 and the media reproducing apparatus 1250.

When the pairing process is completed, the user may use a media service, which is provided by the media share control apparatus 1210 and the media reproducing apparatus 1250, through the already-existing GUI or User eXperience (UX) specified for media services of the media share control apparatus 120.

For example, when the electronic device 1210 corresponds to an iOS module device, when the other electronic device 1250 corresponds to an LG Smart TV, which is manufactured by LG Electronics Inc., and when AirPlay is used as the protocol for providing each media service, the user may use the AirPlay service through a GUI or UX, such as a GUI or UX being provided from an iOS mobile device and an Apple TV, which is manufactured by Apple Inc.

When the user calls (or requests for) a content 1211 from the iOS mobile device 1210, and when the user clicks on the AirPlay icon, a display screen 1210 is displayed. Thereafter, a window 1220 displaying a list of available apparatuses as the content 1211 and media reproducing apparatuses may be displayed on the display screen 1210. When the user selects the LG Smart TV option 1222 from the window 1220, a content 1251, which is identical to the content 1211 of the mobile device, may be displayed on the LG Smart TV 1250.

Figure 13:
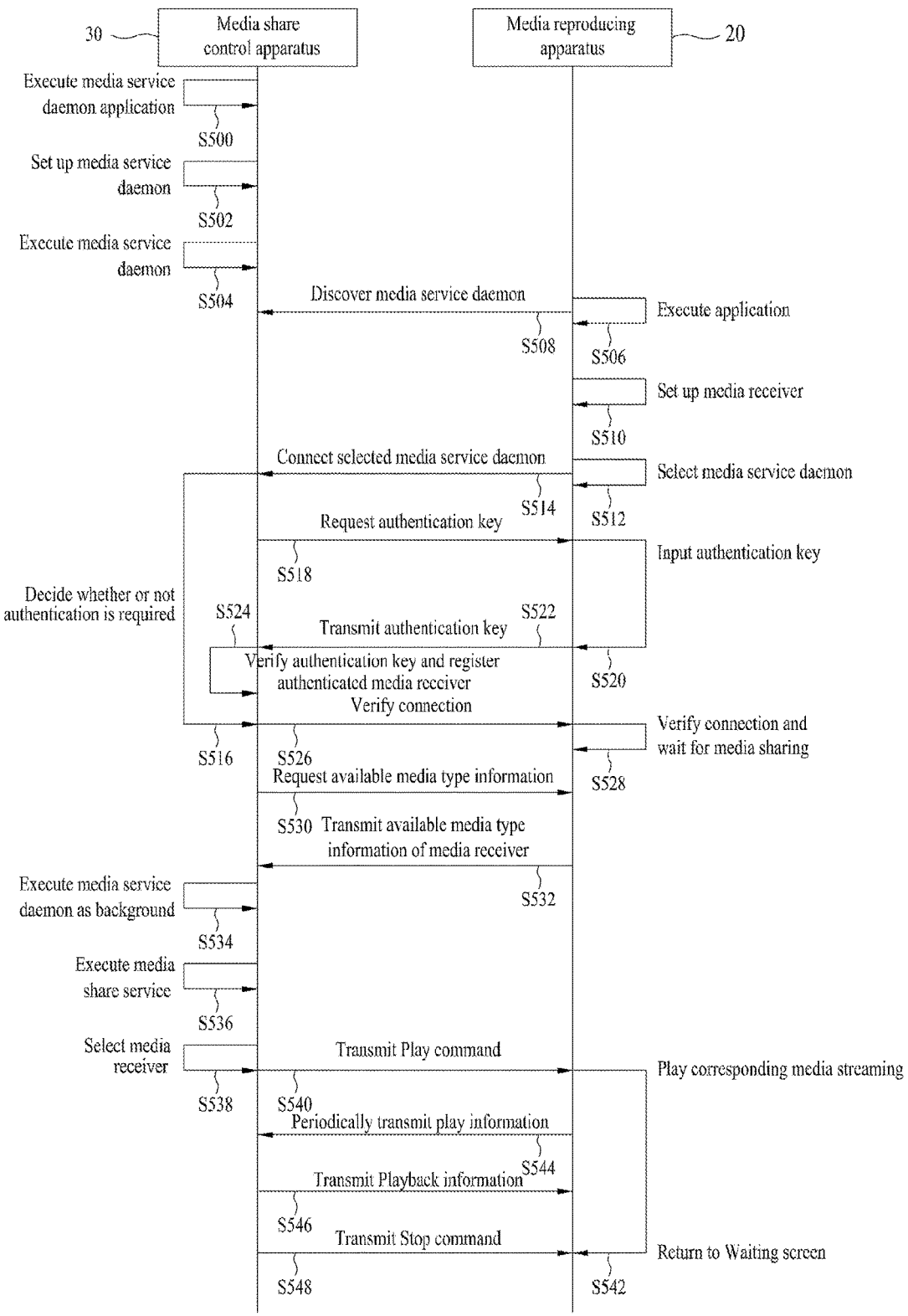
FIG. 13 illustrates a flow chart showing the process steps of a media share method according to another exemplary embodiment of the present invention.

FIG. 13 illustrates a flow chart showing the process steps of a media share method according to another exemplary embodiment of the present invention.

Referring to FIG. 13, the media share control apparatus 30 executes a media service daemon application (S500). The media share control apparatus 30 may display the display screen 810 shown in FIG. 8 as an execution screen of the media service daemon application.

The media share control apparatus 30 sets up a media service daemon (S502). The media share control apparatus 30 may set up the media service daemon in accordance with options that are set up in the GUI 900 shown in FIG. 9.

The media share control apparatus 30 executes the media service daemon (S504). The media share control apparatus 30 detects a user action of selecting an execution button 812, which is included in the GUI 812 shown in FIG. 8, the media share control apparatus 30 may execute a media service daemon web application in accordance with the detected user action.

The media reproducing apparatus 20 executes a media receiver application (S506). The media reproducing apparatus 20 may display the display screen 1010 shown in FIG. 10 as an execution screen of the media receiver application.

The media reproducing apparatus 20 performs discovery on (or discovers) the media service daemon (S508). Herein, a media service daemon search process may be performed by the Web Socket-based Service Discovery 229 shown in FIG. 2 by using the method described above with reference to FIG. 2. A list of the searched media service daemons may be displayed on the display screen 1010. Additionally, the searched media service daemons may be included in the media controller list.

The media reproducing apparatus 20 set up the media receiver (S510). The media reproducing apparatus 20 may set up a media receiver in accordance with options set up from the GUI 110 shown in FIG. 11.

The media reproducing apparatus 20 selects a media service daemon (S512). The media reproducing apparatus 20 may select a media service daemon from the media service daemons listed in the display screen 1010 shown in FIG. 10 either automatically or in accordance with a user input.

Thereafter, the media reproducing apparatus 20 requests for connection to the selected media service daemon (S514).

The media share control apparatus 30 decides whether or not an authentication process is required (s516). The media share control apparatus 30 may verify the media receiver list, so as to decide whether or not to perform the authentication process. If the media receiver, which is executed by the media reproducing apparatus 20 that has requested the connection, corresponds to a media receiver listed in the media receiver list, the media share control apparatus 30 may omit the authentication procedure and may proceed to step S526.

In case the authentication procedure is required to be performed, the media share control apparatus 30 request for the transmission of an authentication key to the media reproducing apparatus 20 (S518).

The media reproducing apparatus 20 requests the user to input the authentication key (S520). Herein, the media reproducing apparatus 20 may display the GUI 1030 shown in FIG. 10, and, then, the media reproducing apparatus 20 may receive the authentication key through the displayed GUI 1030.

The media reproducing apparatus 20 transmits the authentication to the media share control apparatus 30 (S522). Herein, the transmitted authentication key may correspond to the authentication key inputted in step S520 or may correspond to the authentication key that has already been stored.

The media share control apparatus 30 verifies the authentication key and, then, registers the authenticated media receiver (S524). The media share control apparatus 30 verifies whether or not the authentication key transmitted in step S522 is identical to the authentication key that has been set up. Then, when it is determined that the authentication keys are identical to one another, the corresponding media receiver may be processed as an authenticated media receiver. The set up authentication key may correspond to the authentication key 816 being displayed on the display screen 810 shown in FIG. 8. The media share control apparatus 30 may include the authenticated media receiver in the media receiver list.

The media share control apparatus 30 transmits a message notifying a verified connection to the media reproducing apparatus 20 (S526).

The media reproducing apparatus 20 verifies the connection result based upon the message, which is transmitted in step S526, and shifts to a stand-by mode in order to share the media (s528). In step S528, the media reproducing apparatus 20 may display the GUI 1040 shown in FIG. 10.

The media share control apparatus 30 requests the media reproducing apparatus 20 for available media type information of the media receiver (S530).

Figure 14:
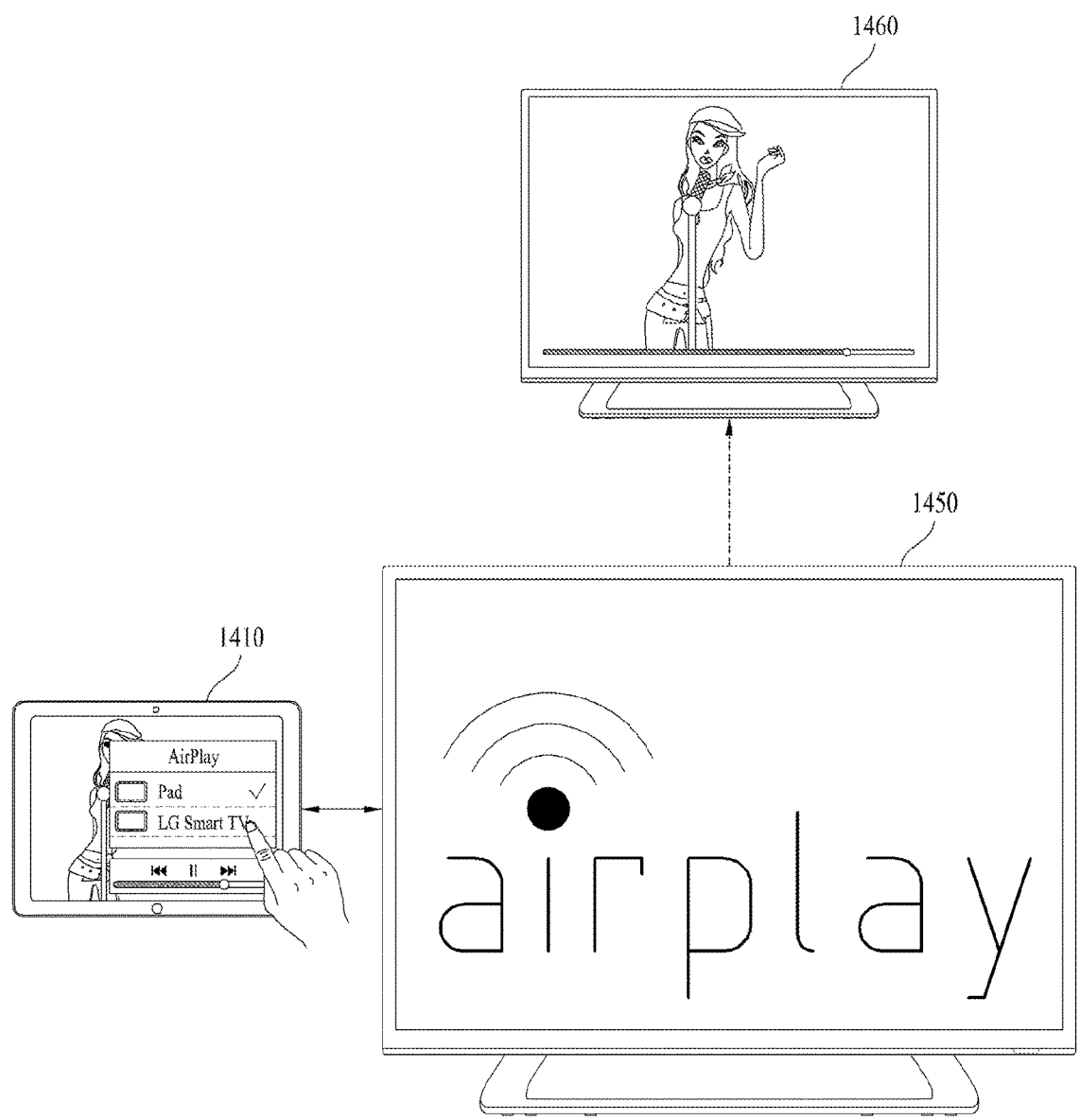
FIG. 14 illustrates an exemplary media share control apparatus and an exemplary display screen showing the execution of a media service within a media reproducing apparatus according to another embodiment of the present invention.

In response to the request for the available media type information of the media receiver, the media reproducing apparatus 20 transmits the available media type information of the executed media receiver to the media share control apparatus 30 (S532). The media reproducing apparatus 20 waits (or stands-by) for streaming reproduction (or playback). The media reproducing apparatus 20 may display the GUI 1040 shown in FIG. 10 or the display screen shown in FIG. 14 as a waiting (or stand-by) screen 1450.

The media share control apparatus 30 executes the media service daemon as background (S534).

The media share control apparatus 30 executes a media share service (S536). The media share service may be automatically executed or may be execute in accordance with a user's request. According to a portion of the embodiment of the present invention, in step S536, the media share control apparatus 30 may display the display screen 1210 shown in FIG. 12 or may display the display screen 1410 shown in FIG. 14.

The media share control apparatus 30 selects a media receiver in order to share a media (S538). Herein, the media share control apparatus 30 may select a media receiver either automatically or in accordance with the user's selection.

The media share control apparatus 30 transmits a Play command to the media receiver, which is selected in step S538 (S540). Herein, the transmitted Play command may be transmitted in accordance with a web-based protocol. The Play command may include information indicating the media that is to be played (or reproduced) and a starting time of the corresponding media. The information on the media that is to be played may correspond to a URL of the media that is to be played.

The media reproducing apparatus 20 plays (or reproduces) the media respective to the Play command (or the media that has been requested to be played) (S542). Herein, the played media may correspond to a media stream being transmitted from the media server 10. According to a portion of the embodiment of the present invention, the media reproducing apparatus 20 may display a content 1460 that is identical to the content 1410 being displayed by the media share control apparatus 30. In this case, the media server 10 may correspond to a module being executed by the media share control apparatus.

The media reproducing apparatus 20 transmits playback information (or Play information) to the media share control apparatus 30 (S544). Herein, the playback information (or Play information) may be periodically transmitted. Additionally, the playback information may be identical to the playback information, which is described above with reference to FIG. 6 or FIG. 7.

The media share control apparatus 30 transmits a Playback command to the media reproducing apparatus 20 (S546). Herein, the transmitted Playback command may be identical to the Playback command, which is described above with reference to FIG. 6 or FIG. 7.

The media share control apparatus 30 transmits a Stop command to the media reproducing apparatus 20 (S548). Herein, the transmitted Stop command may be identical to the Stop command, which is described above with reference to FIG. 6 or FIG. 7.

In case the media reproducing apparatus 20 has received the Stop command, the media reproducing apparatus 20 stops the playback of the media. Then, the media reproducing apparatus 20 may display a waiting screen. Herein, the waiting screen may correspond to the GUI 1040 shown in FIG. 10 or the display screen 1450 shown in FIG. 14.

Figure 15:
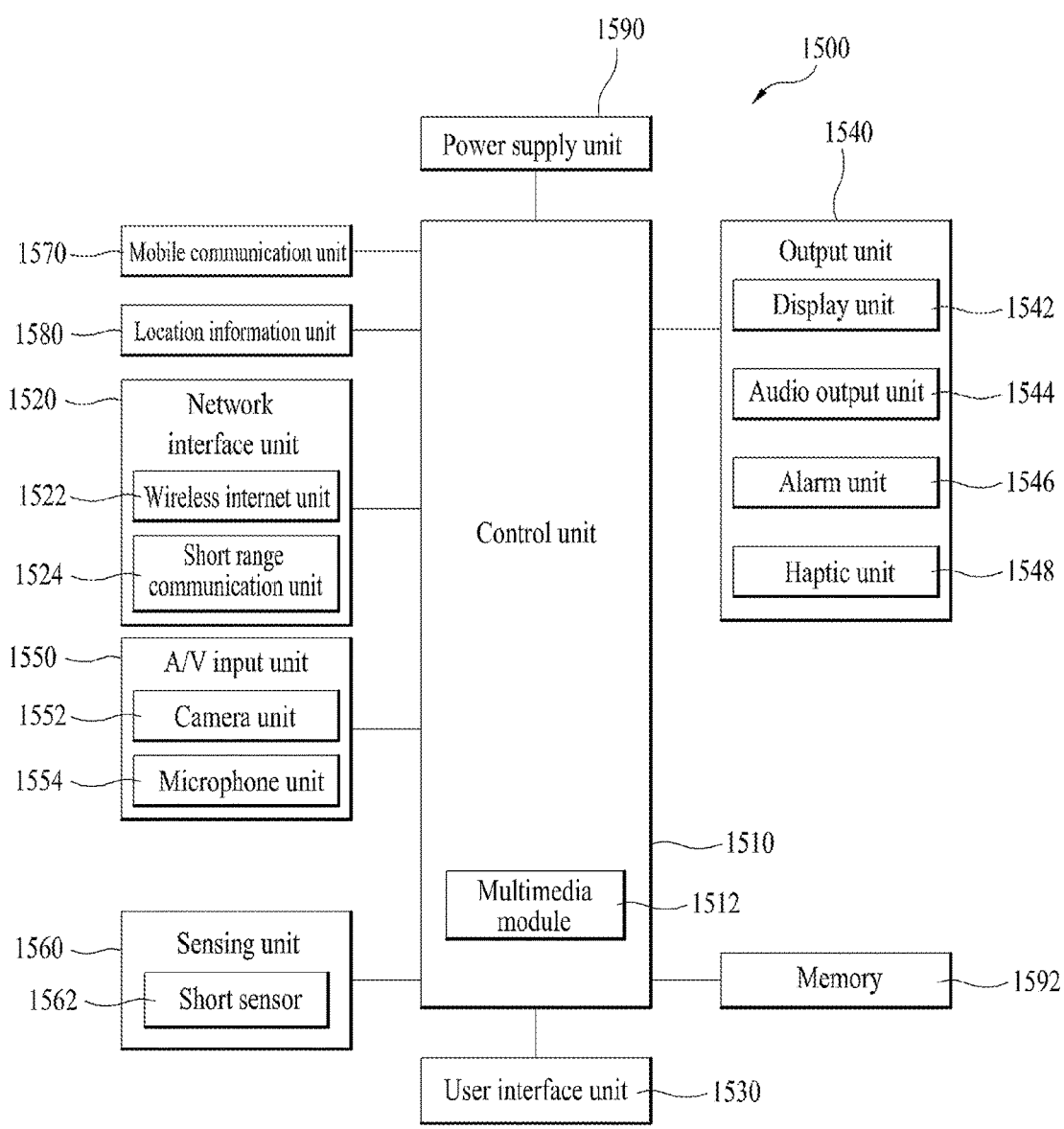
FIG. 15 illustrates a block diagram showing a structure of an electronic apparatus according to an embodiment of the present invention.

FIG. 15 illustrates a block diagram showing a structure of an electronic apparatus according to an embodiment of the present invention.

Referring to FIG. 15, the electronic apparatus 1500 includes a control unit 1510, a network interface unit 1520, a user interface unit 1530, an output unit 1540, an Audio/Video (AN) input unit 1550, a sensing unit 1560, a mobile communication unit 1570, and a location information unit 1580. However, with respect to the present invention, the elements shown in FIG. 15 are not essential elements of the present invention. And, therefore, the electronic apparatus 1500 according to the present invention may not include some of the elements that will be described herein with reference to FIG. 15, and the electronic apparatus 1500 according to the present invention may also further include other elements.

Hereinafter, the elements included in the electronic apparatus 1500 will be described in detail.

The network interface unit 1520 performs access to the media server 10, which stores media data. Then, the network interface unit 1520 searches for a media reproducing apparatus 20 or a media share control apparatus 30 that is available for reproducing media data. Such network interface unit 1520 may include a wireless internet unit 1522 and a short range communication unit 1524 in order to perform the above-described functions.

The wireless internet unit 1522 refers to a module configured to perform a wireless internet access. And, the wireless internet unit 1522 may either be embedded in the electronic apparatus 1500 or may be equipped outside of the electronic apparatus 1500. Herein, Wireless LAN (WLAN or Wi-Fi), Wireless broadband (Wibro), World Interoperability for Microwave Access (Wimax), High Speed Downlink Packet Access (HSDPA), GSM, CDMA, WCDMA, and Long Term Evolution (LTE) may be used as the wireless internet technology, and it will be apparent that the wireless internet technology will not be limited only to the examples listed above.

In light of the fact that the wireless internet access using Wibro, HSDPA, GSM, CDMA, WCDMA, LTE, and so on, is performed through a mobile communication network, the wireless internet unit 1522 performing a wireless internet access through a mobile communication network may be understood and interpreted as an exemplary type of the mobile communication unit 1570.

The short range (or close range) communication unit 1524 refers to a module configured to perform short range communication. Herein, Bluetooth, Radio Frequency Identification (RFID), Infrared Data Association (IrDA), Ultra Wideband (UWB), and ZigBee may be used as the short range communication technology.

The output unit 1540 is configured to generate output associated with visual sense, auditory sense, tactile sense, and so on. And, the output unit 1540 includes a display unit 1542, an audio output unit (or sound output unit) 1544, an alarm unit 1546, and a haptic unit 1548.

The display unit 1542 displays information being processed by the electronic apparatus 1500. For example, when the electronic apparatus 1500 seeks to control the media server 10 and the media reproducing apparatus 20 in order to reproduce (or playback) media data, the display unit 1542 displays a user interface (UI) or a graphical user interface (GUI) in order to perform such functions. More specifically, the display unit 1542 may display a first GUI object enabling the user to select media data and a second GUI object enabling search media data to be selected.

Such display unit 1542 may be configured of a display panel, such as liquid crystal display (LCD) and organic light-emitting diode (OLED). And, when required, the display unit 1542 may also be configured as a display device (or apparatus) for providing stereoscopic images.

Based upon the configuration of the electronic apparatus 1500, at least 2 or more display units 1542 may be provided. For example, in the electronic apparatus 1500 a plurality of display units 1542 may be aligned to be spaced apart from one another or may overlap one another on one surface section. Alternatively, the plurality of display units 1542 may also be positioned at different surface sections of the electronic apparatus 1500.

The audio (or sound) output unit 1544 may output audio data that are received from the network interface unit 1520 or audio data that are stored in the memory 1592. The audio output unit 1544 also outputs audio signals associated with functions being performed by the electronic apparatus 1500. Such audio output unit 1544 may include a receiver, a speaker, a buzzer, and so on.

The alarm unit 1546 output signals for notifying the occurrence of an event in the electronic apparatus 1500. Examples of the events occurring in the electronic apparatus 1500 may include signal reception, message reception, key signal input, touch input, and so on. The alarm unit 1546 may also output signals for notifying the occurrence of an event in formats other than video signals or audio signals, such as vibration. Since the video signals or audio signals may also be outputted through the display unit 1542 or an audio output module 1552, each of the display unit 1542 and the audio output module 1552 may also be categorized as a type of the alarm unit 1546.

The haptic unit 1548 generates diverse tactile (or sensory) effects that be felt by the user. A typical example of a tactile effect is vibration. The haptic unit 1546 may control the intensity or output patterns of the generated vibration. For example, two different types of vibration may be combined and outputted, or two different types of vibration may be serially outputted.

The user interface unit 1530 may be equipped with a sensor (hereinafter referred to as a 'touch sensor'), which detects touch motions, so as to be configured as a touch screen having an inter-layered structure with the display unit 1542. In other words, the user interface unit 1539 and the display unit 1542 may be collectively formed as a single unit. The touch sensor may have diverse formats, such as a touch film, a touch sheet, a touch pad, and do on.

In this case, the user interface unit 1530 may receive a first command and a second command through the user's touch gesture. Most particularly, the first command may be received by the user's touch motion of pressing on the first GUI object for a long period of time. And, the second command may be received by the user's touch motion of dragging and dropping the first GUI object to the second GUI object.

The touch sensor may be configured to convert any change in the pressure being applied to a specific area of the display unit 1542, or any change in the capacitance being generated at a specific area of the display unit 1542, to an electrical input signal. The touch sensor may be configured to detect not only the touched location and surface area but also the pressure applied at the time of the touch gesture is performed.

When a touch input is detected by the touch sensor, the respective signal (or signals) is (or are) sent to a touch controller (not shown). The touch controller processes the received signal (or signals) and transmits the respective data to the control unit 1510. Thus, the control unit 1510 may be capable of knowing which area (or section) of the display unit 1542 has been touched.

The user interface unit 1530 may further include a key pad, a dome switch, a touch pad (static pressure type/capacitive), a jog wheel, a jog switch, and so on.

The control unit 1510 controls the overall operations of the electronic apparatus 1500. The control unit 1510 controls the media server 10 and the media reproducing apparatus 20 through the network interface unit 1520, so that the media reproducing apparatus 20 can reproduce (or playback) the media data in accordance with the first user command and the second user command, which are received from the media reproducing apparatus 20.

The control unit 1510 may perform a processing operation that can recognize a touch gesture of the user, which is inputted through the user interface unit 1530, which is configured of a touch screen. Additionally, the control unit 1510 may also be equipped with a multimedia module 1512 for reproducing (or playing back) multimedia. The multimedia module 1512 may be configured inside the control unit 1510, or the multimedia module 1512 may be configured as an element separate from the control unit 1510.

As described above, when the user selects the electronic apparatus 1500 as the media reproducing apparatus 20, multimedia data may be received from the media server 10 through the network interface unit 1520. Thereafter, the corresponding media data may be played (or reproduced) by the multimedia module 1512, and, then, the reproduced media data may be outputted through the display unit 1542 and the audio output unit.

The A/V input unit 1550 is configured to input audio signals or video signals. The A/V input unit 1550 includes a camera unit 1552 and a microphone unit 1554. The camera unit 1552 processes image frames of still images or moving pictures, which are acquired from an image sensor when operated in a video telephony mode or a recording mode. The processed image frames may be displayed on the display unit 1542.

The image frame processed by the camera unit 1552 may be stored in the memory 1592 or may be transmitted to an external device through the network interface unit. At least two or more camera units 1552 may be provided in accordance with the usage environment. Additionally, the camera unit 1552 may record an image that is to be recognized by the media reproducing apparatus and may provide the recorded image to the control unit 1510.

The microphone unit 1554 receives an external audio signal through a microphone and processes the received audio signal as electrical audio data. In the telephone mode, the processed electrical audio data may be converted to a format that can be transmitted to a mobile communication base station through the mobile communication unit, so as to be outputted. Diverse noise removing (or eliminating) algorithms for removing (or eliminating) noise, which occurs during the process of receiving an external audio signal, may be configured in the microphone unit 1554.

The mobile communication unit 1570 may transmit and receive radio (or wireless) signals to and from at least one of a base station, an external terminal, and a server within the mobile communication network, such as Global System for Mobile communications (GSM), Code Division Multiple Access (CDMA), Wideband CDMA (WCDMA), and it will be apparent that the different types of mobile communication networks will not be limited only to the examples listed above. And, radio signals may include diverse forms of data respective to the transmission and reception (or transception) of an audio call signal, a videophone call signal, or a short text/multimedia message.

The location information unit 1580 corresponds to a module configured to acquire a position of the electronic apparatus 1500. A global position system (GPS) module may be used as the location information unit 1580. The GPS module calculates information on a distance spaced apart from 3 or more satellites and information on the exact time and may, then, apply trigonometry on the calculated information. Thus, the location information unit 1580 may be capable of accurately calculating the current three-dimensional (3D) location information in accordance with latitude, longitude, and altitude. At this point, a method of calculating location and time information by using the three satellites and correcting difference values in the calculated location and time information by using another satellite may be used. Additionally, by continuously calculating the current position in real time, the GPS module may calculate speed information.

The sensing unit 1560 may sense the current status of the electronic apparatus 1500, such as an open/closed state of the electronic apparatus 1500, a location of the electronic apparatus 1500, the presence or absence of a user's touch, a bearing of the electronic apparatus 1500, acceleration/deceleration of the electronic apparatus 1500 and may, then, generate a sensing signal for controlling the operations of the electronic apparatus 1500. Herein, the sensing unit 1560 may include a gyroscope sensor, an acceleration sensor, a geomagnetic sensor, and so on.

The sensing unit 1560 may recognize a relative location of the electronic apparatus 1500 with respect to the media reproducing apparatus and may then output the recognized relative location information to the control unit 1510. Thereafter, based upon the received relative location information, the control unit 1510 may display a second GUI object 14 representing the media reproducing apparatus. Moreover, the sensing unit 1560 may sense whether or not power is being supplied by the power supply unit 1590, whether or not the terminal interface unit 1570 is connected with another external device. Meanwhile, the sensing unit 1560 may further include a short range sensor 1562.

The short range sensor 1562 may be positioned within an internal area of the electronic apparatus 1500, which is covered by the touch screen, or may be positioned within a close range of the touch screen. The short range sensor refers to a sensor configured to sense the presence or absence of an object approaching a predetermined detection surface or the presence or absence of an object existing within a close proximity by using the force of an electromagnetic field or infrared light rays without requiring any mechanical contact. Herein, the short range sensor has a longer duration and greater range of application as compared to a contact sensor.

Examples of the short range sensor can include one of a transmissive photoelectric sensor, a direct reflective photoelectric sensor, a mirror reflective photoelectric sensor, a high frequency oscillation short range sensor, a capacitance short range sensor, a magnetic short range sensor, an infrared short range sensor, and so on. Herein, when the touch-screen corresponds to a capacitive touch-screen, the short range sensor is configured to the proximity range (or short distance range) of a pointer using a change (or variation) of the electric field according to the proximity of the pointer. In this case, the touch-screen (touch sensor) may be categorized as a short range sensor.

The short range sensor detects a short range touch and a proximity touch pattern (e.g., a short range touch distance, a short range touch duration, a short range touch position, a short range touch shift (or relocation) state, and so on.). Additionally, information corresponding to the detected short range touch motion and the detected short range touch pattern may be outputted to the touch-screen.

A program configured to process and control the control unit 1510 may be stored in the memory 1592. And, the memory 1592 may also perform the function of temporarily storing inputted/outputted data (e.g., audio data, still images, moving images, and so on). Usage frequency respective to each set of data (e.g., usage frequency respective to each set of multimedia data) may be stored in the memory 1592. Moreover, information indicating the usage frequency respective to the media reproducing apparatus may be stored in the memory 1592, and, in accordance with this information, the control unit 1510 may control the display unit 1542 so that the display unit 1542 can display a second GUI object based upon the preference level of the corresponding media reproducing apparatus.

Additionally, the memory 1592 may also store data respective to diverse vibration and sound patterns being outputted, when a touch is inputted through the touch-screen.

Furthermore, the memory 1592 may also store a media controller list, a media receiver list, or an authentication key.

The memory 1592 may include at least one type of storage means, such as a flash memory type, a hard disk type, a multimedia card micro type, a card-type memory (e.g., SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The electronic apparatus 1500 may operate in relation with a web storage, which performs the same storage function as the memory 1592 over the internet.

The power supply unit 1590 receives external power and internal power in accordance with the control of the control unit 1510 and, then, supplies the power required for the operations of each element.

The various embodiments of the present invention being described in the description set forth herein may be implemented in a recording medium that can be read by a computer or a similar device by using, for example, software, hardware, or a combination of software and hardware.

In case of implementing the embodiments of the present invention in the form of hardware, the embodiment of the present invention may be implemented by using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and electrical units performing other functions.

In some cases, the embodiments described in the description of the present invention may be implemented by the control unit 1510 itself.

In case of implementing the embodiments of the present invention in the form of software, the embodiments of the present invention corresponding to the procedures and functions described in the description of the present invention may be implemented as separate software modules. Herein, each of the software modules may perform at least one of the functions and operations described in the description of the present invention.

A software code may be implemented by using a software application, which is written in an adequate programming language. The software code may be stored in the memory 1592 and may be executed by the control unit 1510. For example, the streaming server 213, the media service daemon 240, the HTML5 media player 221, the communication management module 223, and the Web Socket-based Service Discovery 229, which are shown in FIG. 2, may be executed by the control unit 1510.

Figure 16:
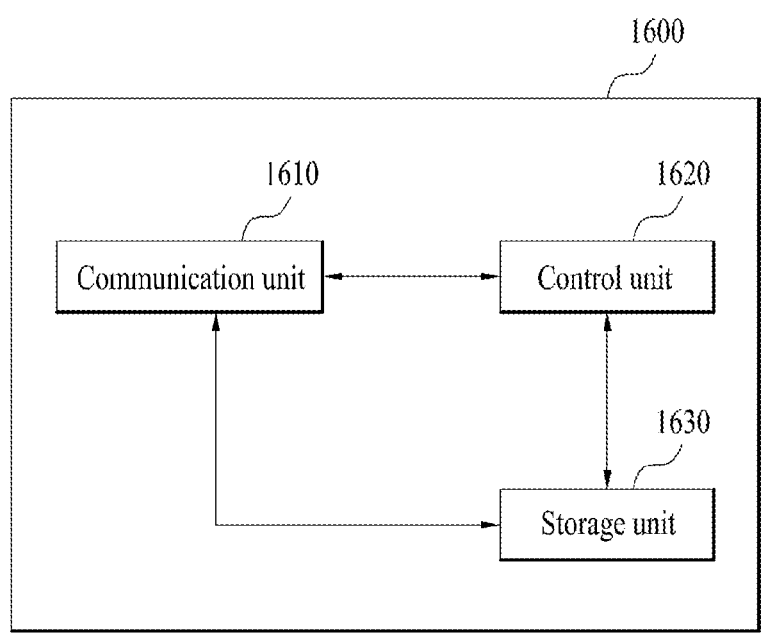
FIG. 16 illustrates a block diagram showing a structure of a media share application providing server according to an embodiment of the present invention.

FIG. 16 illustrates a block diagram showing a structure of a media share application providing server according to an embodiment of the present invention.

Referring to FIG. 16, the media share application providing server 40 may include a communication unit 1610, a control unit 1620, and a storage unit 1630.

The communication unit 1610 may receive a plurality of packets being transmitted through the network 2. Thereafter, the communication unit 1610 may transmit the packets to the media server 10, the media reproducing apparatus 20, and the media share control apparatus 30 through the network 2. The packets may be transmitted by using a Session Initiation Protocol (SIP), a User Datagram Protocol (UDP), and a Transport Control Protocol (TCP).

The control unit 1620 may control the packet transmission of the communication unit 1610. The control unit 1620 may control the packet transmission of the communication unit 1610 based upon a protocol among any one of a Session Initiation Protocol (SIP), a Simple Mail Transfer Protocol (SMTP), a Hypertext Transfer Protocol (HTTP), a File Transfer Protocol (FTP), a Real-Time Streaming Protocol (RTSP), and Multi Media Streaming (MMS).

In response to a request to download a media receiver application or a media service daemon application, which is sent from the electronic apparatus 1500, the control unit 1620 may transmit the downloaded media receiver application or media service daemon application to the electronic apparatus 1500.

The storage unit 1630 may store the received media receiver application or media service daemon application.

It will be apparent that the electronic apparatus and the operating method of the same will not be limited only to the exemplary embodiment described herein. And, therefore, the electronic apparatus and the operating method of the same may also be realized by selectively combining other embodiments of the present invention either fully or partially.

Meanwhile, the operating method of the electronic apparatus according to the present invention may be realized as a code that can be read by a processor provided in the electronic device in a recording medium that can be read by a processor. The recording medium that can be read by the processor includes all types of recording devices storing data that can be read by the processor. Examples of the recording media that can be read by a processor may include ROMs, RAMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

As described above, the media share control apparatus, the media reproducing apparatus, and the method of providing a user interface for the media share thereof have the following advantages. First of all, the present invention may provide pairing between the media share control apparatus and the media reproducing apparatus. And, the present invention may be designed to implement a media receiver end by using a standard web technology through a media service daemon, which relays media share messages. Moreover, according to the present invention, a media share application may be implemented in a Thin Client, and a media share application performing the function of the media receiver may be implemented as a web application type. Thus, the user may be capable of more conveniently using a media share service.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A media share control apparatus for a media share service comprising:
 a network interface configured to communicate with a media server and a media reproducing apparatus; and
 a controller comprising:
  a receiver picker configured to:
   receive a media list from the media server, display a Graphic User Interface (GUI) for the media share service based on the received media list, and
   receive a first message selecting a content from the displayed GUI for the media share service, and
  a media service daemon configured to:
   convert a second message, which is received from the receiver picker through a user datagram protocol, for the media share service in accordance with the web socket-based protocol,
   transmit the converted second message to the media reproducing apparatus, and
   control a web application to execute the selected content for the media share service on the media reproducing apparatus, wherein the media server includes a streaming server for transmitting a media stream to the media reproducing apparatus and uni-directionally transmits the media list to the controller, wherein both the media service daemon of the controller and the media reproducing apparatus include a web socket element for a bi-directional service discovery between the media service daemon and the media reproducing apparatus and bi-directionally communicating messages with the media service daemon and the media reproducing apparatus based on a web socket-based protocol, wherein the media reproducing apparatus includes the web application for the media share service, wherein the media reproducing apparatus receives a media stream of the selected content based on a Uniform Resource Locator (URL) of the selected content, and wherein the controller is further configured to control a reproduction of the selected content, which is displayed through the executed web application on the media reproducing apparatus, based on a GUI provided on the media share control apparatus.

2. The media share control apparatus of claim 1, wherein the second message includes at least one of a Play command, a Playback command, and a Stop command.

3. The media share control apparatus of claim 1, wherein the media service daemon is controlled to transmit at least one of an address of the media service daemon, and a device name of the media reproducing apparatus to the receiver picker.

4. The media share control apparatus of claim 1, wherein the media service daemon includes the media reproducing apparatus in a media receiver list.

5. The media share control apparatus of claim 1, wherein the media service daemon is executed as a background.

6. The media share control apparatus of claim 1, wherein the media service daemon opens a port for receiving a search message transmitted from the media reproducing apparatus and waiting for the search message to be transmitted thereto.

7. The media share control apparatus of claim 1, wherein the media service daemon is configured as a plug-in.

8. The media share control apparatus of claim 7, wherein a module of the media service daemon is configured to:
communicate with the receiver picker by using a media share protocol, and
discover the receiver picker which is configured as a plug-in.

9. A method of controlling a media share service at a share system comprising a media share control apparatus communicating with a media reproducing apparatus through a web socket-based protocol, the method comprising:
receiving a media list from a media server;
displaying a Graphic User Interface (GUI) for the media share service based on the received media list;
receiving a first message selecting a content from the displayed GUI for the media share service;
converting, by a media service daemon, a second message, through a user datagram protocol, requesting to execute a web application for the media share service and to reproduce the selected content for the media share service through the executed web application in accordance with the web socket-based protocol;
transmitting, by the media service daemon, the converted second message to the media reproducing apparatus; and
outputting, at the media share control apparatus, a GUI for controlling a reproduction of the selected content for the media share service through the executed web application on the media reproducing apparatus, wherein the media server includes a streaming server for transmitting a media stream to the media reproducing apparatus and uni-directionally transmits the media list to the media share control apparatus, wherein both the media service daemon of the media share control apparatus and the media reproducing apparatus include a web socket element for a bi-directional service discovery between the media service daemon and the media reproducing apparatus and bi-directionally communicating messages with the media service daemon and the media reproducing apparatus based on the web socket-based protocol, wherein the media reproducing apparatus includes the web application for the media share service, wherein the media reproducing apparatus receives a media stream of the selected content based on a Uniform Resource Locator (URL) of the selected content, and wherein the media share control apparatus is further configured to control a reproduction of the selected content, which is displayed through the executed web application on the media reproducing apparatus, based on a GUI provided on the media share control apparatus.

10. The method of claim 9, wherein the second message includes at least one of a play command, a playback command, and a stop command.

11. The method of claim 9, wherein the media service daemon is controlled to transmit at least one of an address of the media service daemon, and a device name of the media reproducing apparatus to the receiver picker.

12. The method of claim 9, wherein the media service daemon includes the media reproducing apparatus in a media receiver list.

13. The method of claim 9, wherein the media service daemon is executed as a background.

14. The method of claim 9, wherein the media service daemon opens a port for receiving a search message transmitted from the media reproducing apparatus and waiting for the search message to be transmitted thereto.

15. The method of claim 9, wherein the media service daemon is configured as a plug-in.

16. The method of claim 15, wherein a module of the media service daemon:
communicate with the receiver picker by using a media share protocol and
discover the receiver picker which is configured as a plug-in.

* * * * *